(12) United States Patent
Takabayashi et al.

(10) Patent No.: US 9,528,013 B2
(45) Date of Patent: Dec. 27, 2016

(54) ACTINIC RADIATION-CURABLE INK-JET INK AND IMAGE FORMATION METHOD

(71) Applicant: Konica Minolta, Inc., Tokyo (JP)

(72) Inventors: Toshiyuki Takabayashi, Hachioji (JP); Masashi Ikeda, Koganei (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/915,040

(22) PCT Filed: Sep. 9, 2014

(86) PCT No.: PCT/JP2014/004632
§ 371 (c)(1),
(2) Date: Feb. 26, 2016

(87) PCT Pub. No.: WO2015/033584
PCT Pub. Date: Mar. 12, 2015

(65) Prior Publication Data
US 2016/0208118 A1    Jul. 21, 2016

(30) Foreign Application Priority Data
Sep. 9, 2013  (JP) .................................. 2013-186249

(51) Int. Cl.
| | |
|---|---|
| B41J 2/01 | (2006.01) |
| C09D 11/101 | (2014.01) |
| C09D 11/107 | (2014.01) |
| C09D 11/30 | (2014.01) |
| C09D 11/38 | (2014.01) |
| B41J 2/165 | (2006.01) |
| B41J 11/00 | (2006.01) |

(52) U.S. Cl.
CPC ................ *C09D 11/101* (2013.01); *B41J 2/01* (2013.01); *C09D 11/107* (2013.01); *C09D 11/30* (2013.01); *C09D 11/38* (2013.01); *B41J 2/165* (2013.01); *B41J 2/16585* (2013.01); *B41J 11/002* (2013.01)

(58) Field of Classification Search
CPC ........... B41J 2/01; B41J 2/165; B41J 2/16585; B41J 11/002; C09D 11/101; C09D 11/107; C09D 11/30; C09D 11/38
See application file for complete search history.

(56) References Cited

U.S. PATENT DOCUMENTS

| | | |
|---|---|---|
| 2012/0287199 A1 | 11/2012 | Breton et al. |
| 2015/0015648 A1 | 1/2015 | Ikeda et al. |
| 2015/0091973 A1* | 4/2015 | Ikoshi .................. B41J 2/01 347/21 |

FOREIGN PATENT DOCUMENTS

| | | |
|---|---|---|
| JP | 2012236998 A | 12/2012 |
| JP | 2013159615 A | 8/2013 |
| WO | 2013094198 A1 | 6/2013 |

OTHER PUBLICATIONS

International Search Report dated Dec. 9, 2014 for PCT/JP2014/004632 and English translation.

* cited by examiner

*Primary Examiner* — Thinh H Nguyen
(74) *Attorney, Agent, or Firm* — Lucas & Mercanti, LLP

(57) ABSTRACT

Disclosed herein are an active energy ray-curable ink-jet ink that is excellent in ejection stability and does not undergo a local thermal polymerization reaction, and an image forming method using the same. The active energy ray-curable ink-jet ink is an actinic radiation-curable ink-jet ink that undergoes temperature-dependent reversible sol-gel phase transition, comprising a photopolymerizable compound, a photoinitiator, and a gelling agent, wherein the photopolymerizable compound comprises one or more combinations of: a compound A that has n (n is an integer of 2 or more) (meth)acrylate ester units, is represented by the following formula, and has a molecular weight in a range of 280 to 1500; and a compound B that has n−1 (meth)acrylate ester units and a hydroxyl group, is represented by the following formula, and has a molecular weight in a range of 280 to 1500, (wherein n is an integer of 2 or more, R is an n-valent branched or unbranched linear or cyclic hydrocarbon group that optionally contains an oxygen atom or a nitrogen atom, and n and R in both the compounds A and B are the same integer and the same structure, respectively), in at least one of the combinations of the compound A and the compound B, an amount of the compound B contained is 5 to 15 mass % of a total mass of the compound A as a counterpart of the compound B, an amount of the gelling agent contained is 0.5 to 7.0 mass % of a total mass of the ink, and a gelling temperature of the ink is 50° C. or more.

20 Claims, 3 Drawing Sheets

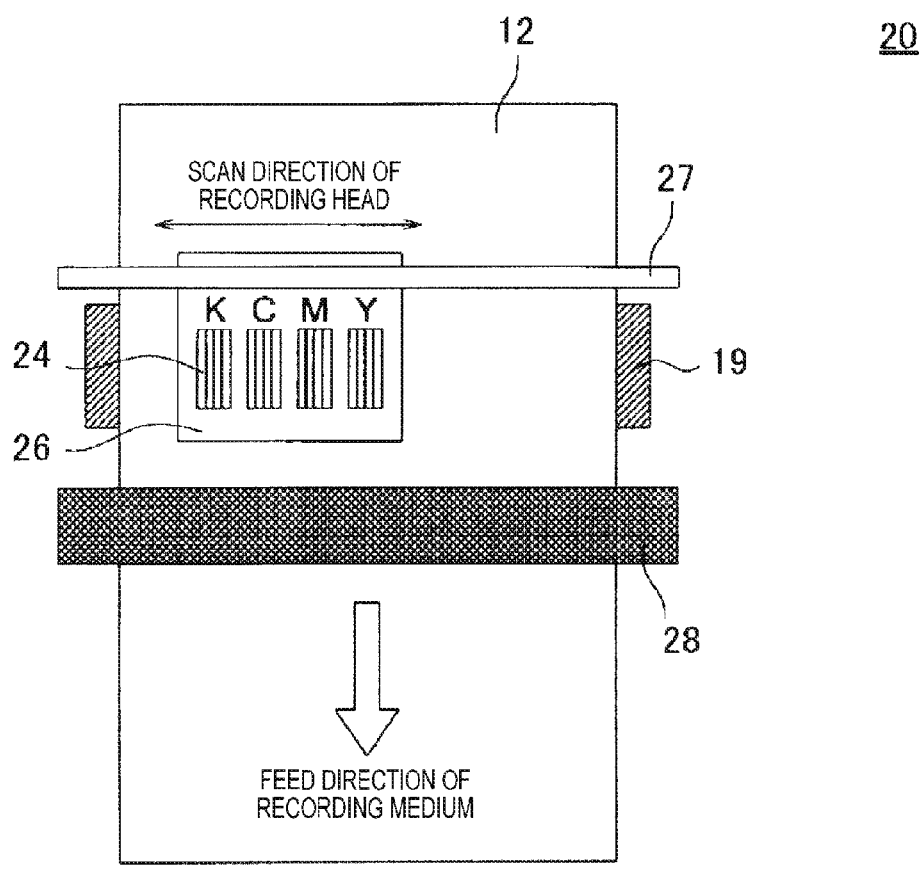

ACTINIC RADIATION-CURABLE INK-JET INK AND IMAGE FORMATION METHOD

CROSS REFERENCE TO RELATED APPLICATION

This Application is a 371 of PCT/JP2014/004632 filed on Sep. 9, 2014 which, in turn, claimed the priority of Japanese Application No. 2013-186249 filed on Sep. 9, 2013, both applications are incorporated herein by reference.

TECHNICAL FIELD

The present invention relates to an actinic radiation-curable ink-jet ink and an image forming method.

BACKGROUND ART

Ink-jet recording systems allow simple and cheap image formation, and are therefore used in various printing fields. One of such ink-jet recording systems is an ultraviolet radiation-curable ink-jet system in which ink-jet ink droplets are landed on a recording medium and then cured by ultraviolet irradiation to form an image. In recent years, the ultraviolet radiation-curable ink-jet system has been attracting attention for its capability to form images having high scratch resistance and adhesiveness even on a recording medium having no ink absorbability (see, for example, Patent Literatures 1 and 2).

When an actinic radiation-curable ink that undergoes temperature-dependent reversible sol-gel phase transition is recorded on a recording medium by the ultraviolet radiation-curable ink-jet system, the ink is heated at a temperature exceeding 50° C. to a liquid state and then ejected from an ink-jet head.

CITATION LIST

Patent Literatures

Patent Literature 1: JP 2012-236998 A
Patent Literature 2: US 2012/0287199 A

SUMMARY OF INVENTION

Technical Problem

However, when the ink is recorded on a recording medium by the ultraviolet radiation-curable ink-jet system, there is a case where the ink undergoes a local thermal polymerization reaction so that polymerization and precipitation occur. Therefore, there is a fear that the occurrence of polymerization and precipitation causes clogging of nozzles of the head. In this case, such local thermal polymerization cannot be inhibited simply by adding a polymerization inhibitor. For this reason, there has been demand for an ink-jet ink that does not undergo a local thermal polymerization reaction and is therefore excellent in ejection stability.

It is therefore an object of the present invention to provide an actinic radiation-curable ink-jet ink that does not undergo a local thermal polymerization reaction and is therefore excellent in ejection stability, an image forming method using the same, and an ink-jet recording apparatus using the same.

Solution to Problem

The present invention relates to the following inventions.
1. An actinic radiation-curable ink-jet ink that undergoes temperature-dependent reversible sol-gel phase transition, comprising a photopolymerizable compound, a photoinitiator, and a gelling agent, wherein
the photopolymerizable compound comprises one or more combinations of:
a compound A that has n (n is an integer of 2 or more) or more (meth)acrylate ester units, is represented by the following formula, and has a molecular weight in a range of 280 to 1500; and
a compound B that has n−1 (meth)acrylate ester units and a hydroxyl group, is represented by the following formula, and has a molecular weight in a range of 280 to 1500,

[Chemical Formula 1]

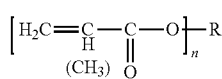

Compound A

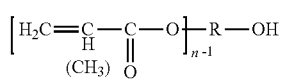

Compound B (wherein n is an integer of 2 or more, R is an n-valent branched or unbranched linear or cyclic hydrocarbon group that optionally contains an oxygen atom or a nitrogen atom, and n and R in both the compounds A and B are the same integer and the same structure, respectively),
in at least one of the combinations of the compound A and the compound B, an amount of the compound B contained is 5 to 15 mass % of a total mass of the compound A as a counterpart of the compound B,
an amount of the gelling agent contained is 0.5 to 7.0 mass % of a total mass of the ink, and
a gelling temperature of the ink is 50° C. or more.
2. The actinic radiation-curable ink-jet ink according to the above 1, wherein a total mass of the compound A and the compound B constituting a combination in which an amount of the compound B contained is 5 to 15 mass % of a total mass of the compound A as a counterpart of the compound B is larger than a total mass of the compound A and the compound B constituting a combination in which an amount of the compound B contained is not 5 to 15 mass % of a total mass of the compound A as a counterpart of the compound B.
3. The actinic radiation-curable ink-jet ink according to the above 1 or 2, wherein the compound A is at least one of the following (meth)acrylate compounds (1) and (2):
(1) a bifunctional (meth)acrylate compound containing, in its molecule, 3 to 14 structures represented by (—C(CH₃) H—CH₂—O—) or (—CH₂—CH₂—O—); and
(2) a bi- or higher-functional (meth)acrylate compound having a cyclic structure in its molecule.
4. The ink-jet ink according to any one of the above 1 to 3, wherein in all the combinations of the compound A and the compound B, an amount of the compound B contained is 5 to 15 mass % of a total mass of the compound A as a counterpart of the compound B.
5. The actinic radiation-curable ink-jet ink according to any one of the above 1 to 4, wherein the combination of the compound A and the compound B is at least one of a combination of a compound represented by the following general formula (3)-A and a compound represented by the following general formula (3)-B, a combination of a compound represented by the following general formula (4)-A and a compound represented by the following general formula (4)-B, a combination of a compound represented by the following general formula (5)-A and a compound represented by the following general formula (5)-B, and a combination of a compound represented by the following general formula (6)-A and a compound represented by the following general formula (6)-B,

[Chemical Formula 2]

(3)-A

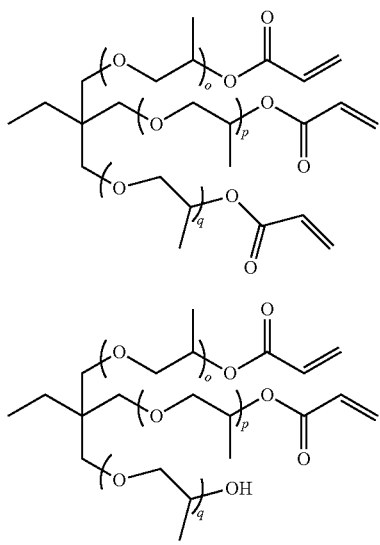

(3)-B

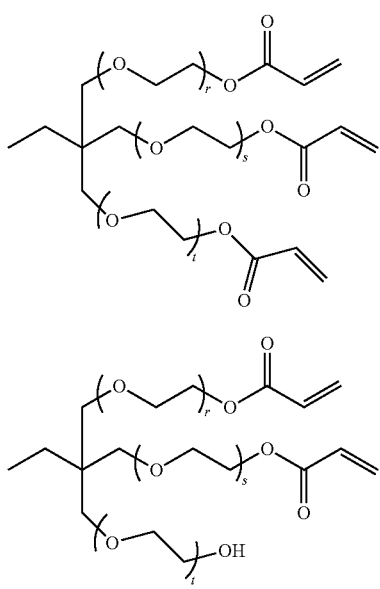

(wherein o, p, and q are integers satisfying the condition o+p+q=2 to 6)

[Chemical Formula 3]

(4)-A (4)-B

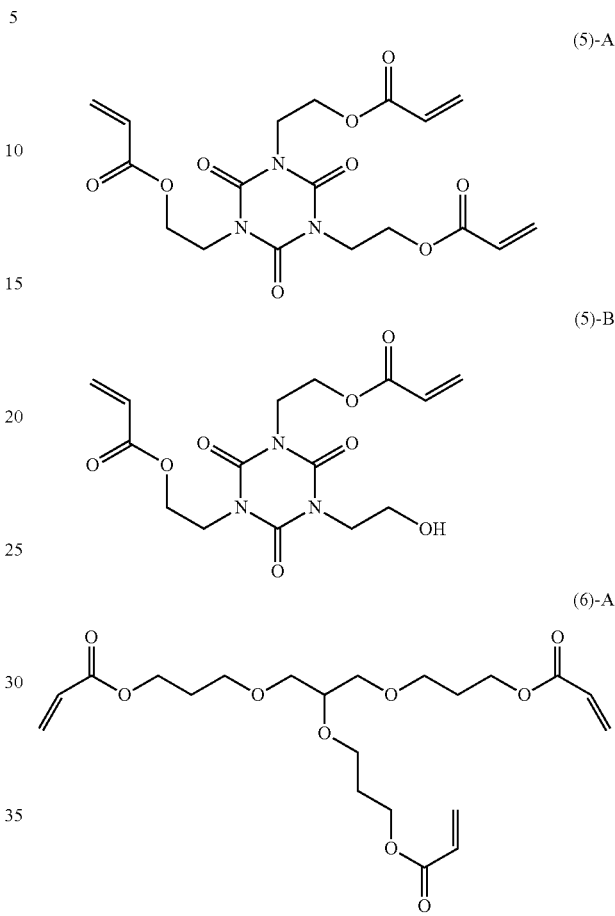

(wherein r, s, and t are integers satisfying the condition r+s+t=5 to 10)

[Chemical Formula 4]

(5)-A (5)-B (6)-A (6)-B

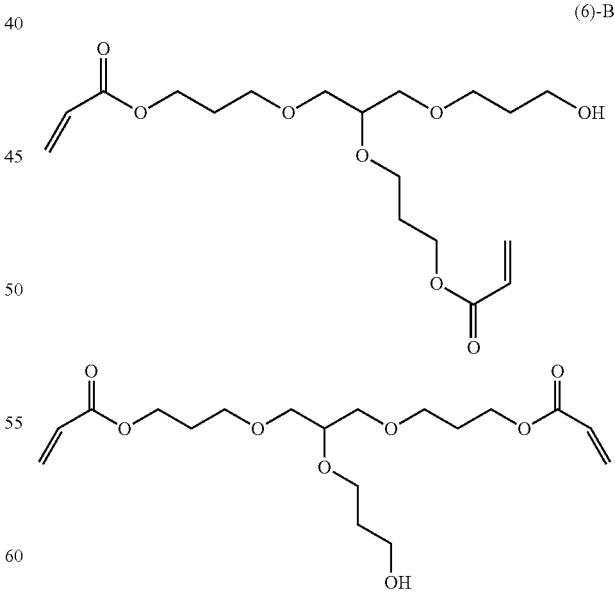

6. The actinic radiation-curable ink-jet ink according to any one of the above 1 to 5, which contains substantially no compound whose molecular weight is not in a range of 280 to 1500.

7. The ink-jet ink according to any one of the above 1 to 6, further comprising a colorant.

8. An image forming method comprising using the actinic radiation-curable ink-jet ink according to anyone of the above 1 to 7, wherein a temperature of a recording material when the ink at 50 to 100° C. ejected from an ink-jet head is landed on the recording material is set to be lower than a sol-gel phase transition temperature of the ink by 10 to 20° C.

9. An ink-jet recording apparatus comprising a head carriage that accommodates a plurality of ink-jet recording heads, an ink tank that holds an ink-jet ink, an ink channel connected to the ink tank and the head carriage, an actinic radiation irradiation part, and a temperature control part, wherein a heating region is provided in at least part of a range from the ink tank to the ink-jet recording heads, the ink-jet recording heads and the ink channel are entirely or partially formed of a metallic member, and the ink according to any one of the above 1 to 7 is further contained.

Advantageous Effects of Invention

According to the present invention, it is possible to provide an actinic radiation-curable ink-jet ink that does not undergo a local thermal polymerization reaction and is therefore excellent in ejection stability, an image forming method using the same, and an ink-jet recording apparatus using the same.

BRIEF DESCRIPTION OF DRAWINGS

FIG. 2 illustrates an example of the structure of a main part of a serial recording-type ink-jet recording apparatus.

DESCRIPTION OF EMBODIMENTS

Figure 1A:
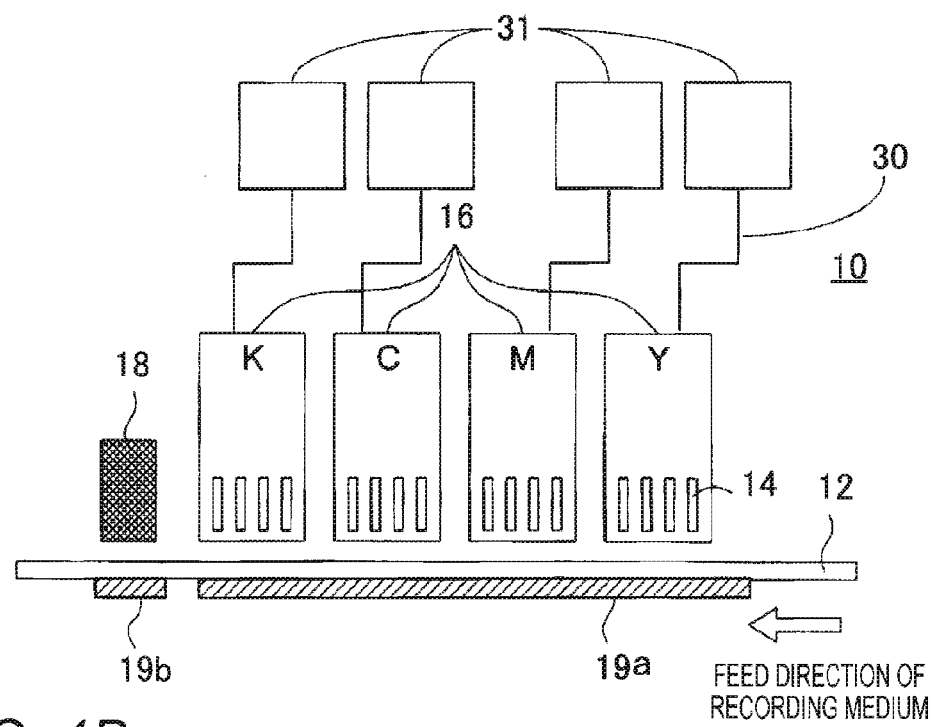
FIG. 1A is a side view illustrating an example of the structure of a main part of a line recording-type ink-jet recording apparatus.

Hereinbelow, the present invention will be described with reference to embodiments, but the present invention is not limited to the following embodiments.

<Actinic Radiation-Curable Ink-Jet Ink>

In order to achieve the above object, the present inventors have studied the cause of a local thermal polymerization reaction of an actinic radiation-curable ink-jet ink. As a result, the present inventors have found that when a metallic member made of, for example, aluminum (Al) or stainless steel (SUS) and used in an ink-jet head and an ink channel comes in contact with the ink at a temperature of, especially, 80° C. or more, the ink undergoes a local thermal polymerization reaction so that polymerization and precipitation occur. The reason why the ink is polymerized and precipitated is uncertain, but it is considered that a radical is generated when the ink comes in contact with the metallic member made of, for example, Al or SUS so that the ink undergoes local radical thermal polymerization. It is to be noted that the occurrence of such polymerization and precipitation in a known gelling agent-containing UV ink and the mechanism thereof are unknown.

The present inventors have found that the occurrence of polymerization and precipitation can be inhibited when, in at least one combination of compounds A and B that will be described later, the amount of the compound B contained is 5 mass % or more of the mass of the compound A, but if the amount of the compound B contained is less than 5 mass % in all the combinations of the compounds A and B, local polymerization and precipitation occur when a heated ink comes in contact with an Al member or SUS member in an ink-jet recording apparatus or ink-jet head, especially when an Al member or SUS member is present near an ink heating region (especially, 80° C. or more). The present inventors have also found that if the amount of the compound B contained exceeds 15 mass % of the mass of the compound A in all the combinations of the compounds A and B, UV curability is significantly reduced so that when image formation is performed at a desired linear speed, satisfactory physical properties of cured film on printed matter are not ensured, and further the solubility of a crystalline gelling agent is reduced so that the gelling agent in the ink is precipitated and separated.

The present inventors have also found that in order to stably eject an ink that is in a sol state at 50° C. or higher from an ink-jet head, the ink preferably uses a photopolymerizable compound having a molecular weight in the range of 280 to 1500. This is because volatilization of the polymerizable compound at a nozzle surface can be prevented, but the reason for this is uncertain. An ink according to an embodiment of the present invention is based on the above findings.

Therefore, the ink-jet ink according to the present invention more remarkably exhibits its effect when used in an ink-jet recording apparatus having a heating region in at least part of an ink channel from an ink tank to an ink-jet head. The position of the heating region is not particularly limited as long as the ink can be solated to achieve excellent ink flowability and ejection stability, but the heating region is preferably provided in at least any one of an ink tank, a sub-ink tank, and an ink-jet head. More preferably, the heating region is provided in one of an ink tank and a sub-ink tank and is also provided in an ink-jet head.

More specifically, the ink according to the embodiment of the present invention is an actinic radiation-curable ink-jet ink that undergoes temperature-dependent reversible sol-gel phase transition, comprising a photopolymerizable compound, a photoinitiator, and a gelling agent, wherein the photopolymerizable compound contains one or more combinations of: a compound A that has n (n is an integer of 2 or more) (meth)acrylate ester units, is represented by the following formula, and has a molecular weight in a range of 280 to 1500; and a compound B that has n−1 (meth)acrylate ester units and a hydroxyl group, is represented by the following formula, and has a molecular weight in a range of 280 to 1500,

[Chemical Formula 5]

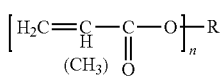

Compound A

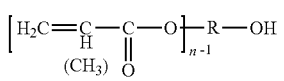

Compound B (wherein n is an integer of 2 or more, R is an n-valent branched or unbranched linear or cyclic hydrocarbon group that optionally contains an oxygen atom or a nitrogen atom, and n and R in both the compounds A and B are the same integer and the same structure, respectively), in at least one of the combinations of the compound A and the compound B, an amount of the compound B contained is 5 to 15 mass % of a total mass of the compound A as a counterpart of the compound B, an amount of the gelling agent contained is 0.5 to 7.0 mass % of a total mass of the ink, and a gelling temperature of the ink is 50° C. or more.

The ink according to the embodiment of the present invention does not undergo a local thermal polymerization reaction and is therefore excellent in storage stability and ejection stability. Further, even when image formation is performed at high speed, satisfactory physical properties of cured film on printed matter can be ensured.

The term "(meth)acrylate" refers to one or both of "acrylate" and "methacrylate", and the term "(meth)acryl" refers to one or both of "acryl" and "methacryl".

[Photopolymerizable Compound]

The photopolymerizable compound is a compound that is crosslinked or polymerized by actinic radiation. Examples of the actinic radiation include electron radiation, ultraviolet radiation, α radiation, γ radiation, and x radiation. Among them, ultraviolet radiation and electron radiation are preferred. The ink according to the embodiment of the present invention contains, as the photopolymerizable compound, a combination of the compounds A and B having the same R. The compound A has n acrylate ester units, and the compound B has n−1 acrylate ester units and a hydroxyl group. In at least one of the combinations of the compounds A and B, the amount of the compound B contained is 5 to 15 mass % of the total mass of the compound A as a counterpart of the compound B. The use of compounds having a molecular weight in the range of 280 to 1500 as the compounds A and B makes it possible to prevent the volatilization of the polymerizable compound at a nozzle surface and therefore achieve excellent ejectability and continuous ejectability.

The amount of the compound B contained is preferably 5 mass % or more but less than 15 mass % of the mass of the compound A. This is because when the amount of the compound B contained is equal to or more than the above lower limit, the occurrence of local polymerization and precipitation can be prevented, and when the amount of the compound B contained is equal to or less than the above upper limit, a reduction in UV curability can be prevented, and even when image formation is performed at a desired linear speed, satisfactory physical properties of cured film on printed matter can be ensured. The amount of the compound B contained is more preferably 5 mass % or more but less than 10 mass % of the mass of the compound A.

When two or more combinations of the compounds A and B are present in the ink according to the embodiment of the present invention, the ink may contain both a combination in which the amount of the compound B contained is 5 to 15 mass % of the total mass of the compound A as a counterpart of the compound B (hereinafter, also referred to as a first combination) and a combination in which the amount of the compound B contained is not 5 to 15 mass % of the total mass of the compound A as a counterpart of the compound B (hereinafter, also referred to as a second combination). At this time, when the total mass of the compounds A and B constituting the first combination is larger than that of the compounds A and B constituting the second combination, the effect of preventing the above-described local polymerization can further be enhanced.

The compound A is preferably a bi- or higher-functional compound having a molecular weight in the range of 280 to 1500, preferably in the range of 300 to 750 and n acrylate ester units.

The compound A in the ink according to the embodiment of the present invention is preferably at least one selected from the following (meth)acrylate compounds (1) and (2). This is because when image formation is performed at a high linear speed of 50 m/s or more, satisfactory physical properties of cured film on printed matter can be ensured.

(1) A bifunctional (meth)acrylate compound having 3 to 14 structures represented by (—C(CH$_3$)H—CH$_2$—O—) or (—CH$_2$—CH$_2$—O—) in its molecule (2) A bi- or higher-functional (meth)acrylate compound having a cyclic structure in its molecule The compound A is more preferably at least one of trifunctional (meth)acrylate compounds represented by the following general formulas (3)-A to (6)-A.

[Chemical Formula 6]

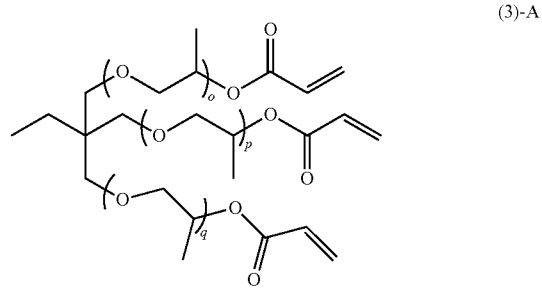

(3)-A (wherein o, p, and q are integers satisfying the condition o+p+q=2 to 6.)

[Chemical Formula 7]

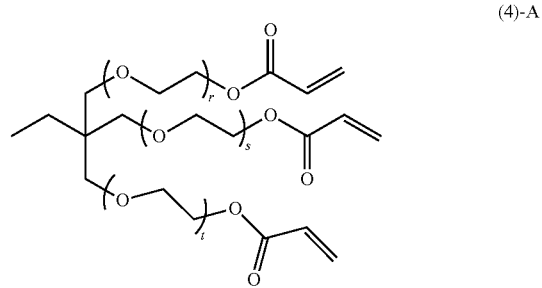

(4)-A (wherein r, s, and t are integers satisfying the condition r+s+t=5 to 10.)

[Chemical Formula 8]

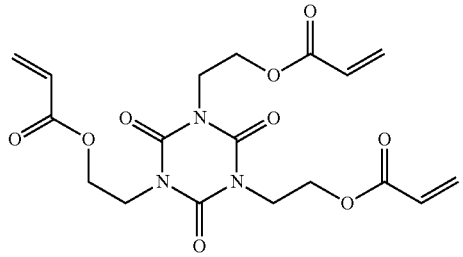 [SMILES: C=CC(=O)OCCn1c(=O)n(CCOC(=O)C=C)c(=O)n(CCOC(=O)C=C)c1=O]

(5)-A

-continued (6)-A

Preferred examples of the compound A include (meth) acrylate compounds listed in the following tables.

[Chemical Formula 9]

| Compound Name | | Structure | Measured Viscosity | Molecular Weight |
|---|---|---|---|---|
| Bi-functional Monomer | Tripropylene glycol diacrylate | | 12 | 300 |
| | PO-modified (3) neopentyl glycol diacrylate | | 17 | 328 |
| | Polyethylene glycol #400 diacrylate | | 59 | 508 |
| | Polyethylene glycol #600 diacrylate | | 97 | 742 |
| | EO-modified 1,6-hexanediol diacrylate | | 39 | 358 |
| | Dioxane glycol diacrylate | | 281 329 | 326 |
| | Tricyclodecane dimethanol diacrylate | | 131 | 304 |

(m + n = 3)

[Chemical Formula 10]

| Compound Name | | Structure | Measured Viscosity | Molecular Weight |
|---|---|---|---|---|
| Poly-functional Monomer | EO-modified (9) tri-methylol-propane triacrylate | | 92 | 560 |
| | PO-modified (3) tri-methylol-propane triacrylate | | 82 | 471 |
| | Glycerin propoxy triacrylate | | 94 | 428 |
| | Tris (2-hydroxy-ethyl)iso-cyanurate triacrylate | | Solid | 423 |

Among the (meth)acrylate compounds having a molecular weight in the range of 280 to 1500, those having a purity of less than 95.0% as measured by high-performance liquid chromatography mass spectrometry are preferred. This is because the above-described local thermal polymerization reaction (polymerization and precipitation) can be effectively prevented.

The compound B to be used is preferably a compound having n−1 acrylate ester units and a hydroxyl group and a molecular weight in the range of 280 to 1500. This is because the use of such a compound having a hydroxyl group in its structure makes it possible to prevent the occurrence of polymerization and precipitation. The reason why the occurrence of polymerization and precipitation can be prevented is uncertain, but it is considered that polymerization and precipitation can be inhibited by the action of a hydroxyl group contained in the structure of the compound B as a polymerization inhibitor. It is to be noted that, for example, when an alcohol different in basic skeleton from the compound B is added instead of the compound B, it is difficult to inhibit local thermal polymerization. It is to be noted that the compound B to be used is a compound that has the same structure as the compound A in its acrylate ester moiety or its moiety except for a hydroxyl group in the following formula.

The compound B is more preferably a compound represented by, for example, any one of the following formulas (3)-B to (6)-B.

[Chemical Formula 11]

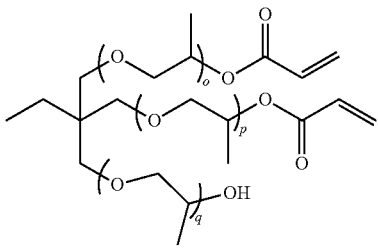

(3)-B (wherein o, p, and q are integers satisfying the condition o+p+q=2 to 6.)

[Chemical Formula 12]

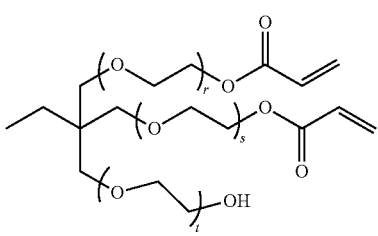

(4)-B (wherein r, s, and t are integers satisfying the condition r+s+t=5 to 10.)

[Chemical Formula 13]

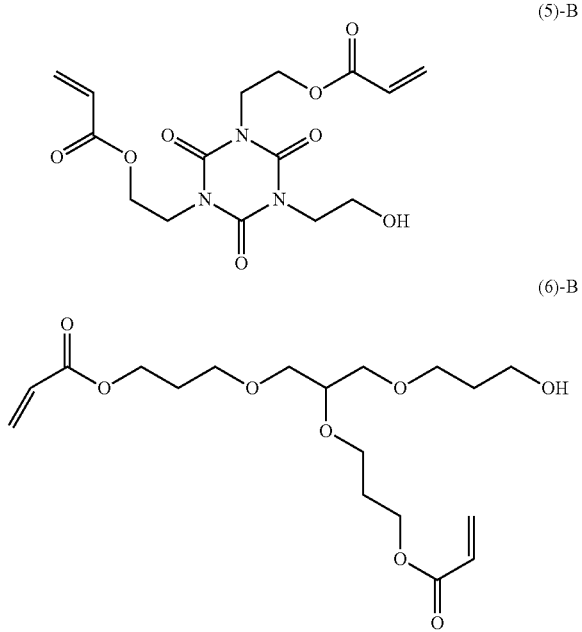

(5)-B (6)-B

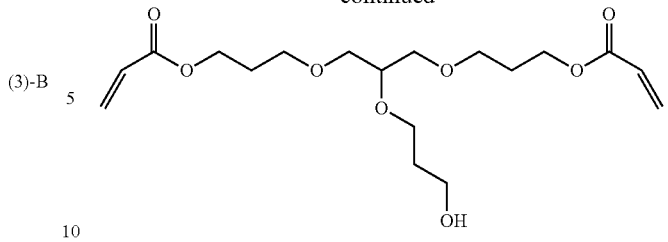

(3)-B

In order to prevent the volatilization of the polymerizable compound at a nozzle surface and to further enhance the effect of improving ejectability and continuous ejectability, the amount of the compound B contained is preferably 5 mass % or more but less than 15 mass % of the mass of the compound A in all the combinations of the compounds A and B.

When the photopolymerizable compound contained in the ink according to the embodiment of the present invention contains substantially no compound whose molecular weight is not in the range of 280 to 1500, the volatilization of the polymerizable compound at a nozzle surface can further be prevented and ejectability and continuous ejectability can further be improved. The phrase "contains substantially no" means that a photopolymerizable compound whose molecular weight is not in the range of 280 to 1500 may be contained as long as the volatilization of the polymerizable compound at a nozzle surface can be prevented and the effects of the present invention can be achieved.

The ink according to the embodiment of the present invention may contain, in addition to the compound A and the compound B, a radical polymerizable compound or a cationic polymerizable compound, preferably a radical polymerizable compound. The radical polymerizable compound or the cationic polymerizable compound may be a polyfunctional compound.

The radical polymerizable compound is a compound (monomer, oligomer, polymer, or a mixture of two or more of them) having a radical polymerizable unsaturated double bond. In the actinic radiation-curable ink-jet ink, only one kind of radical polymerizable compound or two or more kinds of radical polymerizable compounds may be contained.

Examples of the compound having a radical polymerizable unsaturated double bond include unsaturated carboxylic acids and salts thereof, unsaturated carboxylic ester compounds, unsaturated carboxylic urethane compounds, unsaturated carboxylic amide compounds and anhydrides thereof, acrylonitrile, styrene, unsaturated polyesters, unsaturated polyethers, unsaturated polyamides, and unsaturated urethanes. Examples of the unsaturated carboxylic acids include (meth)acrylic acid, itaconic acid, crotonic acid, isocrotonic acid, and maleic acid.

Among them, the radical polymerizable compound is preferably an unsaturated carboxylic ester compound, more preferably a (meth)acrylate compound. The (meth)acrylate compound is not limited to a monomer that will be described later, and may be an oligomer, a mixture of a monomer and an oligomer, a modified product, or an oligomer having a polymerizable functional group.

The actinic radiation-curable ink-jet ink is a sol-gel phase transition-type ink, and therefore at least part of the photopolymerizable compound is preferably an ethylene oxide-modified (meth)acrylate compound. This is because the ethylene oxide-modified (meth)acrylate compound has high photosensitivity and easily forms a card house structure that will be described later when the ink is gelated under low temperature. Further, the ethylene oxide-modified (meth) acrylate compound is easily dissolved in other ink components under high temperature and is less likely to shrink by curing, and therefore printed matter is less likely to curl.

The (meth)acrylate compound may be a polymerizable oligomer. Examples of the polymerizable oligomer include epoxy (meth)acrylate oligomers, aliphatic urethane (meth) acrylate oligomers, aromatic urethane (meth)acrylate oligomers, polyester (meth)acrylate oligomers, and linear (meth)acrylic oligomers.

Examples of the polyfunctional monomer having an unsaturated double bond include compounds having two or more ethylenic groups in a molecule. The ethylenic group refers to, for example, a (meth)acrylic group, a vinyl ether group, an allyl ether group, a styrene group, or a (meth) acrylamide group, and is preferably one selected from the group consisting of an acrylic group, a methacrylic group, a vinyl ether group, and an allyl ether group. This is because photopolymerization can be properly performed.

Examples of the polyfunctional (meth)acrylate compound include: bifunctional monomers such as triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth) acrylate, 1,9-nonanediol di(meth)acrylate, neopentyl glycol di(meth)acrylate, dimethyloltricyclodecane di(meth)acrylate, di(meth)acrylate of bisphenol A-PO adduct, neopentyl glycol hydroxypivalate di(meth)acrylate, and polytetramethylene glycol di(meth)acrylate; and tri- or higher-polyfunctional monomers such as trimethylolpropane tri (meth)acrylate, pentaerythritol tri(meth)acrylate, pentaerythritol tetra (meth)acrylate, dipentaerythritol hexa(meth)acrylate, ditrimethylolpropane tetra(meth)acrylate, glycerin propoxy tri(meth)acrylate, and pentaerythritol ethoxy tetra(meth) acrylate.

The (meth)acrylate compound may be a modified product. Examples of the modified product include: ethylene oxide-modified (meth)acrylate compounds such as ethylene oxide-modified trimethylolpropane tri(meth)acrylate and ethylene oxide-modified pentaerythritol tetraacrylate; caprolactone-modified (meth)acrylate compounds such as caprolactone-modified trimethylolpropane tri(meth)acrylate; and caprolactam-modified (meth)acrylate compounds such as caprolactam-modified dipentaerythritol hexa(meth)acrylate.

It is to be noted that in this specification, the term "(meth)acrylate" includes acrylate monomers and/or acrylate oligomers and methacrylate monomers and/or methacrylate oligomers.

Examples of the polyfunctional vinyl ether compound include the following compounds.

((Bifunctional) Vinyl Ether Compound with Two Polymerizable Functional Groups)

Examples of the bifunctional vinyl ether compound include ethylene glycol divinyl ether, diethylene glycol divinyl ether, triethylene glycol divinyl ether, propylene glycol divinyl ether, dipropylene glycol vinyl ether, butylene divinyl ether, dibutylene glycol divinyl ether, neopentyl glycol divinyl ether, cyclohexanediol divinyl ether, cyclohexanedimethanol divinyl ether, norbornyldimethanol divinyl ether, isovinyl divinyl ether, divinyl resorcin, and divinyl hydroquinone.

((Trifunctional) Vinyl Ether Compound with Three Polymerizable Functional Groups)

Examples of the trifunctional vinyl ether compound include glycerin trivinyl ether, glycerin ethylene oxide adduct trivinyl ether (number of moles of ethylene oxide added: 6), trimethylolpropane trivinyl ether, and trivinyl ether ethylene oxide adduct trivinyl ether (number of moles of ethylene oxide added: 3).

((Tetra- or Higher-Functional) Vinyl Ether Compound with Four or More Polymerizable Functional Groups)

Examples of the tetra- or higher-functional vinyl ether compound include pentaerythritol trivinyl ether (Log P 2.09), ditrimethylolpropane hexavinyl ether (Log P 3.49), and oxyethylene adducts thereof.

Examples of the compound having allyl ether groups include diallyl phthalate and diallyl isophthalate.

An example of the compound having styrene groups includes divinyl benzene.

An example of the compound having (meth)acrylamide groups include N,N-ethylene bisacrylamide.

The amount of the photopolymerizable compound contained in the ink according to the embodiment of the present invention is preferably 1 to 97 mass %, more preferably 30 to 95 mass %.

[Gelling Agent]

The gelling agent contained in the actinic radiation-curable ink-jet ink has the function of allowing the ink to undergo temperature-dependent reversible sol-gel phase transition. Such a gelling agent preferably satisfies at least the following requirements: 1) being dissolved in the photopolymerizable compound or a non-polymerizable resin at a temperature higher than its gelling temperature; and 2) being crystallized in the ink at a temperature equal to or lower than its gelling temperature.

When the gelling agent is crystallized in the ink, the photopolymerizable compound is preferably enclosed in a space three-dimensionally surrounded by plate-like crystals produced by crystallization of the gelling agent. Such a structure in which the photopolymerizable compound is enclosed in a space three-dimensionally surrounded by plate-like crystals is also referred to as a "card house structure". When a card house structure is formed, the liquid photopolymerizable compound can be held therein, and therefore ink droplets can be pinned. This makes it possible to prevent the coalescence of ink droplets. In order to form a card house structure, the photopolymerizable compound and the gelling agent dissolved in the ink are preferably miscible. On the other hand, if phase separation occurs between the photopolymerizable compound and the gelling agent dissolved in the ink, there is a case where it is difficult to form a card house structure.

In order to stably eject ink droplets from an ink-jet recording apparatus, the photopolymerizable compound and the gelling agent are required to be highly miscible in the ink in a sol state (at high temperature). Further, in order to stably prevent the coalescence of ink droplets even in high-speed printing, the gelling agent is preferably quickly crystallized after ink droplets are landed on a recording medium so that a strong card house structure is formed.

Examples of such a gelling agent include:
aliphatic ketone compounds;
aliphatic ester compounds;
petroleum-based waxes such as paraffin wax, microcrystalline wax, and petrolactum;
plant-derived waxes such as candelilla wax, carnauba wax, rice wax, sumac wax, jojoba oil, jojoba solid wax, and jojoba ester;

animal-derived waxes such as beeswax, lanolin, and spermaceti;

mineral waxes such as montan wax and hydrogenated wax;

hydrogenated castor oil or hydrogenated castor oil derivatives;

modified waxes such as montan wax derivatives, paraffin wax derivatives, microcrystalline wax derivatives, and polyethylene wax derivatives;

higher fatty acids such as behenic acid, arachidic acid, stearic acid, palmitic acid, myristic acid, lauric acid, oleic acid, and erucic acid;

higher alcohols such as stearyl alcohol and behenyl alcohol;

hydroxystearic acids such as 12-hydroxystearic acid;

12-hydroxystearic acid derivatives; fatty acid amides such as lauric acid amide, stearic acid amide, behenic acid amide, oleic acid amide, erucic acid amide, ricinoleic acid amide, and 12-hydroxystearic acid amide (e.g., NIKKA AMIDE Series manufactured by Nippon Kasei Chemical Company Limited, ITOWAX Series manufactured by ITOH OIL CHEMICALS CO., LTD., and FATTYAMID Series manufactured by Kao Corporation);

N-substituted fatty acid amides such as N-stearyl stearic acid amide and N-oleyl palmitic acid amide;

speciality fatty acid amides such as N,N'-ethylene bis-stearylamide, N,N'-ethylene bis-12-hydroxystearylamide, and N,N'-xylylene bisstearylamide;

higher amines such as dodecylamine, tetradecylamine, and octadecylamine;

fatty acid ester compounds such as stearyl stearate, oleyl palmitate, glycerin fatty acid esters, sorbitan fatty acid esters, propylene glycol fatty acid esters, ethylene glycol fatty acid esters, and polyoxyethylene fatty acid esters (e.g., EMALLEX Series manufactured by Nihon Emulsion Co., Ltd., RIKEMAL Series manufactured by RIKEN VITAMIN Co., Ltd., and POEM Series manufactured by RIKEN VITAMIN Co., Ltd.);

sucrose fatty acid esters such as sucrose stearate and sucrose palmitate (e.g., RYOTO Sugar Ester Series manufactured by Mitsubishi-Kagaku Foods Corporation);

synthesized waxes such as polyethylene wax and α-olefin/maleic anhydride copolymer wax (e.g., UNILIN Series manufactured by Baker-Petrolite);

dimer acids;

dimer diols (e.g., PRIPOR Series manufactured by CRODA);

fatty acid inulins such as stearoyl inulin;

fatty acid dextrins such as dextrin palmitate and dextrin myristate (e.g., Rheopearl Series manufactured by Chiba Flour Milling Co., Ltd.);

glyceryl behenate/eicosadioate;

polyglyceryl behenate/eicosadioate (e.g., NOMCORT Series manufactured by The Nisshin OilliO Group, Ltd.);

amide compounds such as N-lauroyl-L-glutamic acid dibutylamide and N-(2-ethylhexanoyl)-L-glutamic acid dibutylamide (available from Ajinomoto Fine-Techno Co., Inc.);

dibenzylidene sorbitols such as 1,3:2,4-bis-O-benzylidene-D-glucitol (GEL ALL D available from New Japan Chemical Co., Ltd.); and low-molecular oil gelling agents described in JP 2005-126507 A, JP 2005-255821 A, and JP 2010-111790 A.

Specific examples of the gelling agent are listed in the following table.

TABLE 1

| Category | Structure | Name | Maker |
|---|---|---|---|
| Ketone Wax | Distearyl ketone | KAO WAX T1 | Kao Corporation |
| | | 18-Pentatriacontanone | Reagent (Arfa Aeser) |
| | Dipalmityl ketone | Hentriacontan-16-on | Reagent (Arfa Aeser) |
| | Dilauryl ketone | 12-tricosanone | Reagent (Arfa Aeser) |
| Fatty Acid Ester | Stearyl stearate | EXCEPARL SS | Kao Corporation |
| | | UNISTER M-9676 | NOF CORPORATION |
| | | EMALEX CC-18 | Nihon Emulsion Co., Ltd. |
| | | AMREPS SS | KOKYU ALCOHOL KOGYO CO., LTD. |
| | Cetyl palmitate | AMREPS PC | KOKYU ALCOHOL KOGYO CO., LTD. |
| | Behenyl behenate | UNISTER M-2222SL | NOF CORPORATION |

The actinic radiation-curable ink-jet ink according to the embodiment of the present invention for use in an image forming method contains, as the gelling agent, a compound containing an alkyl chain having 12 or more carbon atoms. The gelling agent containing a linear alkyl group having 12 or more carbon atoms is preferred in that the above-described "card house structure" is easily formed. The gelling agent may have a branched chain.

Specific examples of the gelling agent containing a linear alkyl group having 12 or more carbon atoms include aliphatic ketone compounds, aliphatic ester compounds, higher fatty acids, higher alcohols, and fatty acid amides each having a linear alkyl group having 12 or more carbon atoms.

However, if the gelling agent is, for example, a fatty acid amide having a polar group, such as —OH or —COOH, at the end of its alkyl chain, there is a case where the gelling agent is poor in stability in the ink in a sol state so that precipitation or phase separation occurs. Further, there is a case where bleeding of the gelling agent from cured film of the ink slowly occurs over time. For this reason, the gelling agent is preferably an aliphatic ketone compound or an aliphatic ester compound. More specifically, the gelling agent is preferably a compound represented by the following general formula (G1) or (G2):

R1—CO—R2     General formula (G1):

R3—COO—R4.     General formula (G2):

In the general formulas (G1) and (G2), R1 to R4 are each independently a hydrocarbon group having a straight chain having 12 or more carbon atoms, and R1 to R4 may have a branched chain.

In the general formula (G1), the hydrocarbon groups represented by R1 and R2 are preferably each independently an aliphatic hydrocarbon group containing a straight chain having 12 or more but 25 or less carbon atoms. If the straight chain contained in each of the aliphatic hydrocarbon groups represented by R1 and R2 has less than 12 carbon atoms, the resulting compound does not function as a gelling agent due to insufficient crystallinity, and in addition, there is a fear that a sufficient space for enclosing the photopolymerizable compound cannot be formed in the above-described card house structure. On the other hand, if the straight chain contained in the aliphatic hydrocarbon group has more than 25 carbon atoms, the melting point of the resulting compound is extremely high, and therefore there is a fear that the compound is not dissolved in the ink unless the ejection temperature of the ink is increased.

Examples of the aliphatic ketone compound represented by the above general formula (G1) include dilignoceryl ketone (C24-C24), dibehenyl ketone (C22-C22, melting point: 88° C.), distearyl ketone (C18-C18, melting point: 84° C.), dieicosyl ketone (C20-C20), dipalmityl ketone (C16-C16, melting point: 80° C.), dimyristyl ketone (C14-C14), dilauryl ketone (C12-C12, melting point: 68° C.), lauryl myristyl ketone (C12-C14), lauryl palmityl ketone (C12-C16), myristyl palmityl ketone (C14-C16), myristyl stearyl ketone (C14-C18), myristyl behenyl ketone (C14-C22), palmityl stearyl ketone (C16-C18), palmityl behenyl ketone (C16-C22), and stearyl behenyl ketone (C18-C22).

Examples of a commercialized product of the compound represented by the general formula (G1) include 18-Pentatriacontanon (manufactured by Alfa Aeser), Hentriacontan-16-on (manufactured by Alfa Aeser), 12-tricosanone (manufactured by Alfa Aeser), and KAO WAX T1 (manufactured by Kao Corporation).

In the actinic radiation-curable ink-jet ink, only one kind of aliphatic ketone compound or a mixture of two or more kinds of aliphatic ketone compounds may be contained.

In the general formula (G2), the hydrocarbon groups represented by R3 and R4 are not particularly limited, but are preferably aliphatic hydrocarbon groups each containing a straight chain having 12 or more but 26 or less carbon atoms. When the straight chain contained in each of the aliphatic hydrocarbon groups represented by R3 and R4 has 12 or more but 26 or less carbon atoms, similarly to the compound represented by the general formula (G1), the resulting compound can form the above-described card house structure and does not have an excessively high melting point while having crystallinity necessary for the gelling agent.

Examples of the aliphatic ester compound represented by the general formula (G2) include behenyl behenate (C21-C22, melting point: 70° C.), icosyl icosanoate (C19-C20), stearyl stearate (C17-C18, melting point: 60° C.), palmityl stearate (C17-C16), lauryl stearate (C17-C12), cetyl palmitate (C15-C16, melting point: 54° C.), stearyl palmitate (C15-C18), myristyl myristate (C13-C14, melting point: 43° C.) cetyl myristate (C13-C16, melting point: 50° C.), octyldodecyl myristate (C13-C20), stearyl oleate (C17-C18), stearyl erucate (C21-C18), stearyl linoleate (C17-C18), behenyl oleate (C18-C22), myricyl cerotate (C25-C16), stearyl montanate (C27-C18), behenyl montanate (C27-C22), arachidyl linoleate (C17-C20), and palmityl triacontanate (C29-C16).

Examples of a commercialized product of the aliphatic ester compound represented by the general formula (G2) include UNISTER M-2222SL (manufactured by NOF CORPORATION), UNISTER M-9676 (manufactured by NOF CORPORATION), EXCEPARL SS (manufactured by Kao Corporation, melting point: 60° C.), EMALEXCC-18 (manufactured by Nihon Emulsion Co., Ltd.), AMREPS SS (manufactured by KOKYU ALCOHOL KOGYO CO., LTD.), AMREPS PC (manufactured by KOKYU ALCOHOL KOGYO CO., LTD.), EXEPARL MY-M (manufactured by Kao Corporation), SPERMACETI (manufactured by NOF CORPORATION), and EMALEX CC-10 (manufactured by Nihon Emulsion Co., Ltd.). Most of these commercialized products are mixtures of two or more components, and therefore may be subjected to separation/purification, if necessary.

In the actinic radiation-curable ink-jet ink, only one kind of aliphatic ester compound or a mixture of two or more kinds of aliphatic ester compounds may be contained.

The amount of the gelling agent contained in the actinic radiation-curable ink-jet ink is preferably 0.5 to 7.0 mass %, more preferably 1 to 5 mass % of the total mass of the ink. If the gelling agent content is less than 0.5 mass %, ink droplets cannot undergo gelation (temperature-dependent sol-gel phase transition). If the gelling agent content exceeds 7 mass %, there is a problem that an image surface is likely to be scratched due to poor hardness of cured film after light curing.

[Photoinitiator]

The actinic radiation-curable ink-jet ink may further contain a photoinitiator, if necessary.

The photoinitiator is classified into an intramolecular bond cleavage-type photoinitiator and an intramolecular hydrogen abstraction-type photoinitiator. Examples of the intramolecular bond cleavage-type photoinitiator include: acetophenones such as diethoxy acetophenone, 2-hydroxy-2-methyl-1-phenylpropane-1-one, benzyl dimethyl ketal, 1-(4-isopropylphenyl)-2-hydroxy-2-methylpropane-1-one, 4-(2-hydroxyethoxy)phenyl-(2-hydroxy-2-propyl) ketone, 1-hydroxycyclohexyl-phenyl ketone, 2-methyl-2-morpholino(4-thiomethylphenyl)propane-1-one, and 2-benzyl-2-dimethylamino-1-(4-morpholinophenyl)-butanone;

benzoins such as benzoin, benzoin methyl ether, and benzoin isopropyl ether;

acylphosphine oxides such as 2,4,6-trimethylbenzoin diphenylphosphine oxide; and benzyl and methylphenyl glyoxy ester.

Examples of the intramolecular hydrogen abstraction-type photoinitiator include: benzophenones such as benzophenone, methyl o-benzoyl benzoate, 4-phenyl benzophenone, 4,4'-dichlorobenzophenone, hydroxybenzophenone, 4-benzoyl-4'-methyl-diphenylsulfide, acrylated benzophenone, 3,3',4,4'-tetra(t-butylperoxycarbonyl)benzophenone, and 3,3'-dimethyl-4-methoxybenzophenone;

thioxanthones such as 2-isopropylthioxanthone, 2,4-dimethylthioxanthone, 2,4-diethylthioxanthone, and 2,4-dichlorothioxanthone;

aminobenzophenones such as Michler's ketone and 4,4'-diethylaminobenzophenone; and 10-butyl-2-chloroacridone, 2-ethylanthraquinone, 9,10-phenanthrenequinone, and camphorquinone.

Among them, acylphosphine oxides and acylphosphonates can preferably be used from the viewpoint of sensitivity.

Specific examples of such preferred photoinitiators include
bis(2,4,6-trimethylbenzoyl)-phenylphosphine oxide and
bis(2, 6-dimethoxybenzoyl)-2, 4, 4-trimethyl-pentylphosphine oxide.

The amount of the photoinitiator to be added is preferably 0.1 to 10 mass %, particularly preferably 2 to 8 mass % of the total mass of the ink composition.

The actinic radiation-curable ink-jet ink may contain, as the photoinitiator, a photo-acid generating agent. Examples of the photo-acid generating agent include compounds used for chemical amplification-type photoresists or photocationic polymerization (see pages 187 to 192 of "Organic materials for imaging" edited by The Japanese Research Association for Organic Electronics Materials and published by Bunshin Publishing (1993)).

The actinic radiation-curable ink-jet ink may further contain a photoinitiator aid or a polymerization inhibitor, if necessary. The photoinitiator aid may be a tertiary amine compound, and is preferably an aromatic tertiary amine compound. Examples of the aromatic tertiary amine compound include N,N-dimethylaniline, N,N-diethylaniline, N,N-dimethyl-p-toluidine, N,N-dimethylamino-p-benzoic acid ethyl ester, N,N-dimethylamino-p-benzoic acid isoamyl ethyl ester, N,N-dihydroxyethylaniline, triethylamine, and N,N-dimethylhexylamine. Among them, N,N-dimethylamino-p-benzoic acid ethyl ester and N,N-dimethylamino-p-benzoic acid isoamyl ethyl ester are preferred. These compounds may be used singly or in combination of two or more of them.

Examples of the polymerization inhibitor include (alkyl) phenol, hydroquinone, catechol, resorcin, p-methoxyphenol, t-butylcatechol, t-butylhydroquinone, pyrogallol, 1,1-picrylhydrazyl, phenothiazine, p-benzoquinone, nitrosobenzene, 2,5-di-tert-butyl-p-benzoquinone, dithiobenzoyl disulfide, picric acid, cupferron, aluminum N-nitrosophenyl hydroxylamine, tri-p-nitrophenylmethyl, N-(3-oxyanilino-1, 3-dimethylbutylidene) aniline oxide, dibutyl cresol, cyclohexanone oxime cresol, guaiacol, o-isopropylphenol, butyraldoxime, methyl ethyl ketoxime, and cyclohexanone oxime.

[Colorant]

The ink-jet ink may further contain at least one of various known dyes and pigments. Particularly, a pigment is preferably contained.

Examples of a pigment that may be contained in the ink-jet ink are listed below.

C.I. Pigment Yellow 1, 2, 3, 12, 13, 14, 16, 17, 73, 74, 75, 81, 83, 87, 93, 95, 97, 98, 109, 114, 120, 128, 129, 138, 150, 151, 154, 155, 180, 185, 213

C.I. Pigment Red 5, 7, 12, 22, 38, 48:1, 48:2, 48:4, 49:1, 53:1, 57:1, 63:1, 101, 112, 122, 123, 144, 146, 168, 184, 185, 202

C.I. Pigment Violet 19, 23

C.I. Pigment Blue 1, 2, 3, 15:1, 15:2, 15:3, 15:4, 18, 22, 27, 29, 60

C.I. Pigment Green 7, 36

C.I. Pigment White 6, 18, 21

C.I. Pigment Black 7

The average particle diameter of the pigment is preferably 0.08 to 0.5 µm, and the maximum particle diameter of the pigment is 0.3 to 10 µm, preferably 0.3 to 3 µm. Adjusting the particle diameter of the pigment makes it possible to prevent clogging of nozzles of an ink-jet recording head and to maintain ink storage stability, ink transparency, and curing sensitivity.

On the other hand, the ink-jet ink may contain a dye such as an oil-soluble dye. Examples of the oil-soluble dye include the following various dyes. Examples of a magenta dye include: MS Magenta VP, MS Magenta HM-1450, and MS Magenta HSo-147 (all manufactured by Mitsui Toatsu Chemicals, Inc.); AIZEN SOT Red-1, AIZEN SOT Red-2, AIZEN SOT Red-3, AIZEN SOT Pink-1, and SPIRON Red GEH SPECIAL (all manufactured by Hodogaya Chemical Co., Ltd.); RESOLIN Red FB 200%, MACROLEX Red Violet R, and MACROLEX ROT5B (all manufactured by Bayer Japan); KAYASET Red B, KAYASET Red 130, and KAYASET Red 802 (all manufactured by Nippon Kayaku Co., Ltd.); PHLOXIN, ROSE BENGAL, and ACID Red (all manufactured by DaiwaKasei Co., Ltd.); HSR-31 and DIARESIN Red K (all manufactured by Mitsubishi Kasei Corporation); and Oil Red (manufactured by BASF Japan Ltd.).

Examples of a cyan dye include: MS Cyan HM-1238, MS Cyan HSo-16, Cyan HSo-144, and MS Cyan VPG (all manufactured by Mitsui Toatsu Chemicals, Inc.); AIZEN SOT Blue-4 (manufactured by Hodogaya Chemical Co., Ltd.); RESOLIN BR. Blue BGLN 200%, MACROLEX Blue RR, CERES Blue GN, SIRIUS SUPRATURQ. Blue Z-BGL, and SIRIUS SUPRA TURQ. Blue FB-LL 330% (all manufactured by Bayer Japan); KAYASET Blue FR, KAYASET Blue N, KAYASET Blue 814, Turq. Blue GL-5 200, and Light Blue BGL-5 200 (all manufactured by Nippon Kayaku Co., Ltd.); DAIWA Blue 7000 and Oleosol Fast Blue GL (all manufactured by DaiwaKasei Co., Ltd.); DIARESIN Blue P (manufactured by Mitsubishi Kasei Corporation); and SUDAN Blue 670, NEOPEN Blue 808, and ZAPON Blue 806 (all manufactured by BASF Japan Ltd.).

Examples of a yellow dye include: MS Yellow HSm-41, Yellow KX-7, and Yellow EX-27 (all manufactured by Mitsui Toatsu Chemicals, Inc.); AIZEN SOT Yellow-1, AIZEN SOT Yellow-3, and AIZEN SOT Yellow-6 (all manufactured by Hodogaya Chemical Co., Ltd.); MACROLEX Yellow 6G and MACROLEX FLUOR. Yellow 10GN (all manufactured by Bayer Japan); KAYASET Yellow SF-G, KAYASET Yellow 2G, KAYASET Yellow A-G, and KAYASET Yellow E-G (all manufactured by Nippon Kayaku Co., Ltd.); DAIWA Yellow 330HB (manufactured by DaiwaKasei Co., Ltd.); HSY-68 (manufactured by Mitsubishi Kasei Corporation); and SUDAN Yellow 146 and NEOPEN Yellow 075 (all manufactured by BASF Japan Ltd.).

Examples of a black dye include: MS Black VPC (manufactured by Mitsui Toatsu Chemicals, Inc.); AIZEN SOT Black-1 and AIZEN SOT Black-5 (all manufactured by Hodogaya Chemical Co., Ltd.); RESORIN Black GSN 200% and RESOLIN Black BS (all manufactured by Bayer Japan); KAYASET Black A-N (manufactured by Nippon Kayaku Co., Ltd.); DAIWA Black MSC (manufactured by DaiwaKasei Co., Ltd.); HSB-202 (manufactured by Mitsubishi Kasei Corporation); and NEPTUNE Black X60 and NEOPEN Black X58 (all manufactured by BASF Japan Ltd.).

The amount of the pigment or dye contained is preferably 0.1 to 20 mass %, more preferably 0.4 to 10 mass % of the mass of the actinic radiation-curable ink-jet ink. If the pigment or dye content is too small, the resulting image is poor in coloring, and if the pigment or dye content is too large, ejectability is reduced due to increased ink viscosity.

The ink-jet ink may further contain, as a dispersant aid, a synergist appropriate to the pigment used. The total amount of a dispersant and a dispersant aid is preferably 1 to 50 mass % of the mass of the pigment.

The pigment needs to be dispersed in the ink-jet ink. Therefore, the ink-jet ink is preferably obtained by preparing a pigment dispersion and then mixing the pigment dispersion and other ink components.

The pigment dispersion can be prepared by dispersing a pigment in a dispersion medium. The pigment may be dispersed by, for example, a ball mill, sand mill, attritor, roll mill, agitator, Henschel mixer, colloid mill, ultrasonic homogenizer, pearl mill, wet jet mill, or paint shaker. When the pigment is dispersed, a dispersant may be added. The dispersant is preferably a polymeric dispersant. Examples of the polymeric dispersant include Solsperse Series manufactured by Avecia and PB Series manufactured by Ajinomoto Fine-Techno Co., Inc.

The dispersion medium of the pigment dispersion may be a solvent or a polymerizable compound, but is preferably solvent-free because the ink-jet ink according to the present invention is preferably gelated just after landed on a recording medium. Further, if a solvent remains in a cured image, problems occur, such as degradation in solvent resistance and volatilization of an organic compound (VOC) from the remaining solvent. For this reason, the ink-jet ink according to the present invention is preferably a solvent-free ink. Therefore, in view of suitability for dispersion, the dispersion medium selected for preparing a pigment dispersion is preferably not a solvent but a polymerizable compound, especially a monomer having the lowest viscosity.

[Other Components]

The actinic radiation-curable ink-jet ink may further contain other components, if necessary. The other components may be various additives and other resins. Examples of the additives include surfactants, leveling agents, matting agents, ultraviolet absorbers, infrared absorbers, antimicrobial agents, and basic compounds for enhancing the storage stability of ink. Examples of the basic compounds include basic alkali metal compounds, basic alkaline earth metal compounds, and basic organic compounds such as amines. Examples of the other resins include resins for adjusting the physical properties of cured film. Examples of such resins include polyester-based resins, polyurethane-based resins, vinyl-based resins, acrylic resins, rubber-based resins, and waxes.

[Sol-Gel Phase Transition-Type Ink-Jet Ink]

As described above, the actinic radiation-curable ink-jet ink contains a gelling agent, and therefore undergoes temperature-dependent reversible sol-gel phase transition. The photocurable ink that undergoes sol-gel phase transition is liquid (sol) at high temperature (e.g., at about 80° C.), and therefore can be ejected in a sol state from an ink-jet recording head. When the actinic radiation-curable ink-jet ink is ejected under high temperature, ink droplets (dots) are landed on a recording medium and then gelated by natural cooling. This makes it possible to prevent the coalescence of adjacent dots and therefore to enhance image quality.

In order to enhance the ejectability of ink droplets, the viscosity of the ink under high temperature is preferably equal to or less than a certain value. Specifically, the viscosity of the actinic radiation-curable ink-jet ink at 80° C. is preferably 3 to 20 mPa·s. On the other hand, in order to prevent the coalescence of adjacent dots, the viscosity of the ink at ordinary temperature after landing is preferably equal to or more than a certain value. Specifically, the viscosity of the actinic radiation-curable ink-jet ink at 25° C. is preferably 1000 mPa·s or more.

The gelling temperature of the ink is preferably 50° C. or higher but 100° C. or lower, more preferably 50° C. or higher but 70° C. or lower. When the ejection temperature is near 80° C. and the gelling temperature of the ink exceeds 70° C., gelation is likely to occur at the time of ejection, and therefore ejectability is reduced. If the gelling temperature is less than 40° C., there is a case where the ink is not quickly gelated after landed on a recording medium. The gelling temperature is a temperature at which the flowability of the ink in a sol state is reduced by gelation in the process of cooling the ink.

The viscosity at 80° C., viscosity at 25° C., and gelling temperature of the ink can be determined by measuring a change in the dynamic viscoelasticity of the ink with temperature using a rheometer. Specifically, the ink is heated to 100° C. and then cooled to 20° C. at a shear rate of 11.7 (1/s) and a temperature reduction rate of 0.1° C./s to obtain a viscosity-temperature curve. Then, the viscosity at 80° C. and viscosity at 25° C. of the ink can be determined by reading the values of viscosity at 80° C. and 25° C. in the viscosity-temperature curve, respectively. The gelling temperature can be determined as a temperature at which the value of viscosity in the viscosity-temperature curve is 200 mPa·s.

As the rheometer, a stress control-type rheometer (Physica MCR Series manufactured by Anton Paar) may be used. The diameter of a cone plate may be 75 mm and a cone angle may be 1.0°.

[Ink-Jet Ink Production Method]

The actinic radiation-curable ink-jet ink can be obtained by mixing components, including the above-described photo polymerizable compound and gelling agent, with heating. Preferably, the actinic radiation-curable ink-jet ink is obtained by preparing a pigment dispersion in which a colorant (especially, pigment) is dispersed in part of the polymerizable compound and then mixing the pigment dispersion and other ink components including the remaining polymerizable compound.

<Ink-Jet Recording Apparatus and Image Recording Method Using the Same>

The present inventors have found that the above-described problem of nozzle clogging caused by the occurrence of polymerization and precipitation is particularly remarkable when a high-resolution image is formed by printing in which small droplets of 1 to 4 pl are ejected using a head whose nozzle diameter is 30 μm or less to achieve a resolution of 1200 dpi×1200 dpi or more. An image forming method using the above-described ink according to the embodiment of the present invention is not particularly limited, but the present inventors have found that the ink according to the embodiment of the present invention is preferably used in the following image forming method.

Specifically, an image forming method according to an embodiment of the present invention comprises using the above-described ink, wherein the ink is ejected at 50 to 100° C. from an ink-jet head, and a temperature of a recording material when the ink is landed on the recording material is lower than a sol-gel phase transition temperature of the ink by 10 to 20° C. The image forming method according to the embodiment of the present invention includes at least the following two steps of:

(1) ejecting the actinic radiation-curable ink-jet ink from an ink-jet recording head to adhere the ink onto a recording medium; and (2) irradiating ink droplets landed on the recording medium with light from a UV light source to cure the ink droplets.

[Step (1)]

The actinic radiation-curable ink-jet ink shall be the above-described ink-jet ink.

Ink droplets are ejected from an ink-jet recording head. In order to enhance the ejectability of ink droplets, the temperature of the ink-jet ink in the ink-jet recording head is preferably set to be higher than the gelling temperature by 10 to 30° C. If the temperature of the ink in the ink-jet recording head is lower than (gelling temperature+10) ° C., the ink is gelated in the ink-jet recording head or at a nozzle surface, and therefore the ejectability of ink droplets is likely to be reduced. On the other hand, if the temperature of the ink in the ink-jet recording head exceeds (gelling temperature+30) ° C., there is a case where the ink components are degraded due to an excessively high ink temperature.

For this reason, droplets of the ink-jet ink shall be ejected at a temperature in the above range by heating the ink-jet ink in a heating region provided in at least any one of the ink-jet recording head, an ink channel connected to the ink-jet recording head, and an ink tank connected to the ink channel.

The volume of the ink per droplet ejected from each nozzle of the ink-jet recording head depends on the resolution of an image to be formed, but is preferably 0.5 to 10 pl, and is more preferably 0.5 to 4.0 pl to form a high-resolution image. In order to achieve this, recording needs to be performed using an ink-jet recording head having a nozzle diameter of less than 30 μm. However, the use of the above-described ink makes it possible to reproducibly form a high-resolution image with high stability even when recording is performed using a head having a nozzle diameter of less than 30 μm.

The ink droplets landed on a recording medium is cooled and quickly gelated by sol-gel phase transition. As a result, the ink droplets can be pinned without being scattered. Further, as described above, oxygen inhibition in polymerization of the photopolymerizable compound can be reduced.

The recording medium may be paper or resin film. Examples of the paper include coated paper for printing and coated paper B for printing. Examples of the resin film include polyethylene terephthalate film and vinyl chloride film.

By ejecting ink droplets from the ink-jet recording head, the ink droplets are adhered onto a recording medium. The temperature of the recording medium when the ink droplets are landed on the recording medium is preferably set to be lower than the gelling temperature of the ink by 10 to 20° C. If the temperature of the recording medium is excessively low, there is a case where the ink droplets are excessively quickly gelated and pinned, and therefore leveling of the ink droplets is not satisfactorily achieved so that image glossiness is reduced. On the other hand, if the temperature of the recording medium is excessively high, there is a case where the ink droplets are less likely to be gelated so that adjacent dots of the ink droplets are mixed together. By appropriately adjusting the temperature of the recording medium, it is possible to achieve moderate leveling and appropriate pinning so that adjacent dots of the ink droplets are not mixed together.

In the photocurable ink-jet ink, the gelling agent is stably dissolved in the ink solvent. Therefore, image glossiness can be adjusted by adjusting the temperature of a recording medium. If the gelling agent cannot be stably present in the ink solvent, nozzle clogging occurs due to precipitation of part of the gelling agent during ink ejection so that image quality is reduced. Further, if the gelling agent is slowly crystallized after the ink is landed on a recording medium, image quality is reduced, because mixing of dots occurs even when the temperature of the recording medium is adjusted.

The feed rate of a recording medium is preferably 40 to 120 m/min. The feed rate is preferably higher because the speed of image formation is increased. However, if the feed rate is excessively high, image quality is reduced or photo-curing of the ink (described later) is insufficient.

The image forming method according to the embodiment of the present invention is superior in ejection stability to conventional methods for forming an image using an ink-jet head, especially an ink-jet head having a nozzle diameter of 30 μm or less.

[Step (2)]

The photopolymerizable compound contained in the ink droplets is cross-linked or polymerized by irradiating the ink droplets landed on the recording medium with light so that the ink droplets are cured to form an image.

The light with which the ink droplets adhered onto the recording medium are irradiated is preferably ultraviolet radiation from an LED light source. Specifically, a water-cooled LED at 395 nm manufactured by Phoseon Technology can be used. A metal halide lamp or the like may be used as an ultraviolet source, but the use of an LED as an ultraviolet source is effective at preventing the surface of cured film of the ink droplets from being poorly cured due to melting of the ink droplets by radiant heat from the light source.

In order to cure the ink droplets, the LED as a light source is set so that the peak illuminance of ultraviolet radiation at 370 to 410 nm on an image surface is preferably 0.5 to 10 $W/cm^2$, more preferably 1 to 5 $W/cm^2$. When the ink droplets are exposed to light under irradiation conditions satisfying such a requirement, the recording medium is preferably fed at a rate of 50 m/min or more (120 m/min or less) to inhibit exposure of the ink droplets to radiant heat from the light source.

In order to inhibit the coalescence of the ink droplets adjacent to each other, the ink droplets are irradiated with light within 10 seconds, preferably 0.001 seconds to 5 seconds, more preferably 0.01 seconds to 2 seconds after the ink droplets are adhered onto the recording medium. The light irradiation is preferably performed after ink droplets are ejected from all the ink-jet recording heads accommodated in a head carriage.

[Ink-Jet Recording Apparatus]

The image forming method according to the present invention can be performed using a photocurable-type ink-jet recording apparatus. The photocurable-type ink-jet recording apparatus is classified into a line recording type (single pass recording type) and a serial recording type. The type of the photocurable-type ink-jet recording apparatus may be selected depending on a desired image resolution or a recording speed, but the line recording (single pass recording) type is preferred in terms of rapid recording.

Figure 1B:
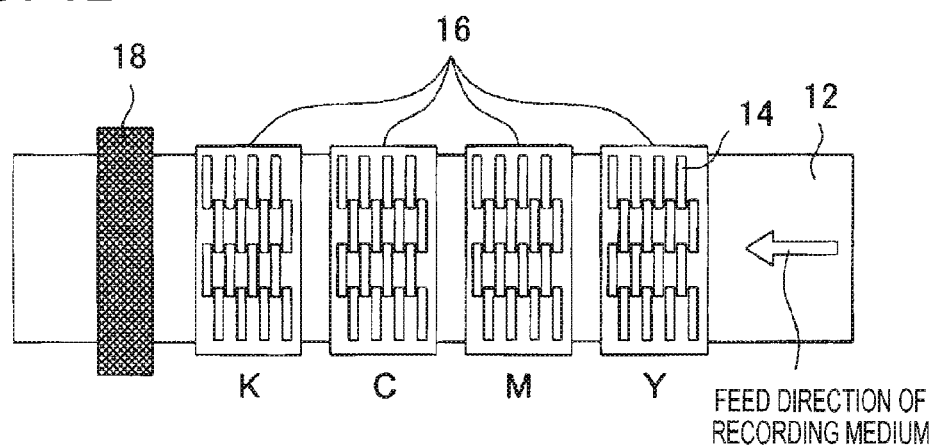
FIG. 1B is a top view of FIG. 1A.

FIG. 1A is a side view illustrating an example of the structure of a main part of a line recording-type ink-jet printer, and FIG. 1B is a top view of FIG. 1A. As shown in FIGS. 1A and 1B, an ink-jet printer 10 includes a head carriage 16 that accommodates a plurality of ink-jet recording heads 14, an ink channel 30 connected to the head carriage 16, an ink tank 31 that stores ink to be supplied through the ink channel 30, an actinic radiation irradiation part 18 that covers the full width of a recording medium 12 and is provided downstream of the head carriage 16 (in the feed direction of the recording medium), and a temperature control part 19 (19a and 19b) provided on the lower side of the recording medium 12. In the present invention, a heating region is preferably provided in at least part of a range from the ink tank 31 to the ink-jet recording heads 14. More preferably, the heating region is provided in the ink tank 31 and the ink-jet recording heads 14.

The head carriage 16 is connected to the ink tank 31 that stores ink through the ink channel 30. The head carriage 16 is fixedly provided to cover the full width of the recording medium 12, and accommodates the ink-jet recording heads 14 provided for respective colors. Each of the ink-jet recording heads 14 is configured so that ink is supplied thereto. For example, each of the ink-jet recording heads 14 may be configured so that ink is supplied from an ink cartridge (not shown) detachably attached to the ink-jet printer 10 to the ink-jet recording head 14 directly or through a means for supplying ink (not shown).

The ink-jet recording heads 14 provided for respective colors are arranged in the feed direction of the recording medium 12. The number of the ink-jet recording heads 14 arranged in the feed direction of the recording medium 12 is set depending on the nozzle density of each of the ink-jet recording heads 14 and the resolution of a printed image. For example, when an image having a resolution of 1440 dpi is formed using the ink-jet recording heads 14 with a droplet volume of 2 pl and a nozzle density of 360 dpi, the four ink-jet recording heads 14 may be arranged in a staggered manner in the feed direction of the recording medium 12. Further, when an image having a resolution of 720×720 dpi is formed using the ink-jet recording heads 14 with a droplet volume of 6 pl and a nozzle density of 360 dpi, the two ink-jet recording heads 14 may be arranged in a staggered manner. The term "dpi" represents the number of ink droplets (dots) per 2.54 cm.

The actinic radiation irradiation part 18 covers the full width of the recording medium 12 and is arranged downstream of the head carriage 16 in the feed direction of the recording medium. The actinic radiation irradiation part 18 irradiates ink droplets ejected from the ink-jet recording heads 14 and landed on the recording medium 12 with actinic radiation to cure the ink droplets.

When the actinic radiation is ultraviolet radiation, examples of the actinic radiation irradiation part 18 (ultraviolet irradiation means) include fluorescent lamps (low-pressure mercury lamps, bactericidal lamps), cold-cathode tubes, ultraviolet lasers, low-, middle-, high-pressure mercury lamps with an operating pressure of several hundred Pa to 1 MPa, metal halide lamps, and LEDs. From the viewpoint of curability, an ultraviolet irradiation means that radiates ultraviolet rays at an illuminance of 100 mW/cm$^2$ or more is preferred, and specific examples thereof include high-pressure mercury lamps, metal halide lamps, and LEDs. Among these ultraviolet irradiation means, LEDs are particularly preferred from the viewpoint of low radiant heat as well as low power consumption. A specific example of the LED as the ultraviolet irradiation means includes a water-cooled LED at 395 nm manufactured by Phoseon Technology.

When the actinic radiation is electron radiation, examples of the actinic radiation irradiation part 18 (electron irradiation means) include scanning-type electron irradiation means, curtain beam-type electron irradiation means, and broad beam-type electron irradiation means. From the viewpoint of processing capability, curtain beam-type electron irradiation means are preferred. Examples of the electron irradiation means include "Curetron EBC-200-20-30" manufactured by NHV Corporation and "Min-EB" manufactured by AIT.

The temperature control part 19 (19a and 19b) is provided on the lower side of the recording medium 12 to maintain the recording medium 12 at a predetermined temperature. Examples of the temperature control part 19 include various heaters.

Hereinbelow, the image forming method using the line recording-type ink-jet printer 10 will be described. The recording medium 12 is fed between the head carriage 16 and the temperature control part 19a of the ink-jet printer 10. On the other hand, the recording medium 12 is adjusted to a predetermined temperature by the temperature control part 19a. Then, ink heated in the heating region is ejected from the ink-jet recording heads 14 in the head carriage 16 so as to be adhered onto (landed on) the recording medium 12. Then, ink droplets adhered onto the recording medium 12 are cured by irradiation with actinic radiation from the actinic radiation irradiation part 18.

The temperature of the ink in the ink-jet recording heads 14 when the ink is ejected from the ink-jet recording heads 14 is preferably set to be higher than the gelling temperature of the ink by 10 to 30° C. to enhance the ejectability of the ink. If the temperature of the ink in the ink-jet recording heads 14 is less than (gelling temperature+10) ° C., the ejectability of the ink is likely to be reduced due to gelation of the ink in the in-jet recording heads 14 or at nozzle surfaces. On the other hand, if the temperature of the ink in the ink-jet recording heads 14 exceeds (gelling temperature+30) ° C., there is a case where the ink components are degraded due to an excessively high temperature of the ink.

The volume of ink per droplet ejected from each nozzle of the ink-jet recording heads 14 depends on image resolution, but is preferably 0.5 pl to 10 pl, more preferably 1 pl to 4.0 pl to form a high-resolution image.

In order to inhibit the coalescence of the ink droplets adjacent to each other, the irradiation with actinic radiation from the actinic radiation irradiation part 18 is performed within 10 seconds, preferably 0.001 seconds to 5 seconds, more preferably 0.01 seconds to 2 seconds after the ink droplets are adhered onto the recording medium. The irradiation with actinic radiation is preferably performed after the ink is ejected from all the ink-jet recording heads 14 accommodated in the head carriage 16. At this time, the temperature of the recording medium 12 is appropriately adjusted by the temperature control part 19b. The temperature of the recording medium 12 at this time may be the same as or different from the temperature of the recording medium 12 during ink ejection, that is, the temperature of the recording medium 12 adjusted by the temperature control part 19a.

When the actinic radiation is electron radiation, the accelerating voltage of electron irradiation is preferably 30 to 250 kV, more preferably 30 to 100 kV to sufficiently cure the ink. When the accelerating voltage is 100 to 250 kV, the dose of electron irradiation is preferably 30 to 100 kGy, more preferably 30 to 60 kGy.

The total film thickness of an image after ink curing is preferably 2 to 25 μm. The term "total film thickness" refers to the maximum film thickness of a cured product of the ink landed on the recording medium.

FIG. 2 illustrates an example of the structure of a main part of a serial recording-type ink-jet printer 20. As shown in FIG. 2, the ink-jet printer 20 may be configured in the same manner as the ink-jet printer 10 shown in FIG. 1 except that a head carriage 26 that has a width smaller than the full width of the recording medium and accommodates a plurality of ink-jet recording heads 24 and a guide part 27 for moving the head carriage 26 in the width direction of the recording medium 12 are provided instead of the head carriage 16 fixedly provided so as to cover the full width of the recording medium.

In the serial recording-type ink-jet printer 20, ink is ejected from the ink-jet recording heads 24 accommodated in the head carriage 26 while the head carriage 26 is moved along the guide part 27 in the width direction of the recording medium 12. After the completion of movement of the head carriage 26 in the width direction of the recording medium 12 (for each pass), the recording medium 12 is advanced in the feed direction thereof. Then, an actinic radiation irradiation part 28 performs irradiation with actinic radiation. Except for these operations, the serial recording-type ink-jet printer 20 performs image recording in almost the same manner as the above-described line recording-type ink-jet printer 10.

The ink-jet recording apparatus according to the present invention has a heating region in at least part of a range from the ink tank to the ink-jet recording heads. Even when the ink-jet recording heads and the ink channel are entirely or partially formed of a metallic member, the above-described ink-jet ink according to the present invention contained therein does not undergo a local thermal polymerization reaction, and therefore excellent ejection stability is achieved. The metallic member is preferably made of Al or SUS. The ink-jet recording apparatus according to the present invention is excellent in ejection stability even when the ink-jet recording heads have a nozzle diameter of 30 μm or less.

EXAMPLES

Hereinbelow, the present invention will be specifically described with reference to examples, but is not limited thereto.

<Preparation of Photopolymerizable Compounds>

Photopolymerizable compounds 1 to 8 and photopolymerizable compounds 101 to 108 and 113 each having the following composition were prepared. It is to be noted that the percentage of the compound B was determined as the mass ratio of the compound B to the compound A calculated by the following formula:

Percentage of Compound $B$=[Parts by Mass of Compound $B$/Parts by Mass of Compound $A$]×100

Figure 3:
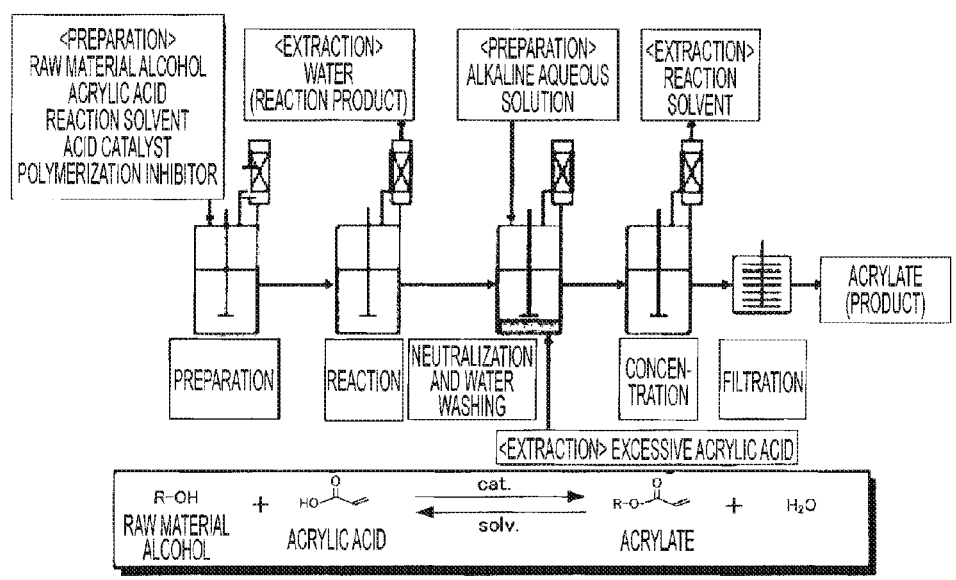
FIG. 3 is a flow chart of a general dehydration transesterification method.

The compound A (acrylate monomer) can be prepared by common "dehydration ester exchange" using any alcohol and acrylic acid as shown in FIG. 3, but may be prepared by any other method. In this regard, each monomer was synthesized by adjusting the amount of acrylic acid to be reacted so that the ratio between the compound A and the compound B shown in each of Tables 2 to 16 was achieved.

Monomers of Examples

Photopolymerizable compound 1: Tripropylene glycol diacrylate (molecular weight: 300)
  Compound 1A: 89.0 parts by mass
  Compound 1B: 5.3 parts by mass
  Percentage of Compound 1B: 6.0%
Photopolymerizable compound 2: 9EO-modified trimethylolpropane triacrylate (molecular weight: 693)
  Compound 2A: 74.1 parts by mass
  Compound 2B: 9.3 parts by mass
  Percentage of Compound 2B: 12.6%
Photopolymerizable compound 3: 3PO-modified trimethylolpropane triacrylate (molecular weight: 471)
  Compound 3A: 89.6 parts by mass
  Compound 3B: 6.5 parts by mass
  Percentage of Compound 3B: 7.3%
Photopolymerizable compound 4: Polyethylene glycol diacrylate (molecular weight: 508)
  Compound 4A: 90.3 parts by mass
  Compound 4B: 5.5 parts by mass
  Percentage of Compound 4B: 6.1%
Photopolymerizable compound 5: Tricyclodecane dimethanol diacrylate (molecular weight: 304)
  Compound 5A: 86.7 parts by mass
  Compound 5B: 7.8 parts by mass
  Percentage of Compound 5B: 9.0%
Photopolymerizable compound 6: Dioxane glycol diacrylate (molecular weight: 326)
  Compound 6A: 88.2 parts by mass
  Compound 6B: 8.1 parts by mass
  Percentage of Compound 6B: 9.2%
Photopolymerizable compound 7: Tris(2-hydroxyethyl)isocyanurate triacrylate (molecular weight: 423)
  Compound 7A: 79.1 parts by mass
  Compound 7B: 8.9 parts by mass
  Percentage of Compound 7B: 11.3%
Photopolymerizable compound 8: Glycerin propoxy triacrylate (molecular weight: 428)
  Compound 8A: 84.9 parts by mass
  Compound 8B: 7.6 parts by mass
  Percentage of Compound 8B: 9.0%
  (Monomers of Comparative Examples)
Photopolymerizable compound 101: Tripropylene glycol diacrylate (molecular weight: 300)
  Compound 101A: 95.9 parts by mass
  Compound 101B: 2.6 parts by mass
  Percentage of Compound 101B: 2.7%
Photopolymerizable compound 102: 9EO-modified trimethylolpropane triacrylate (molecular weight: 693)
  Compound 102A: 80.1 parts by mass
  Compound 102B: 2.6 parts by mass
  Percentage of Compound 102B: 3.2%
Photopolymerizable compound 103: 3PO-modified trimethylolpropane triacrylate (molecular weight: 471)
  Compound 103A: 91.2 parts by mass
  Compound 103B: 3.3 parts by mass
  Percentage of Compound 103B: 3.6%
Photopolymerizable compound 104: Polyethylene glycol diacrylate (molecular weight: 508)
  Compound 104A: 92.5 parts by mass
  Compound 104B: 2.1 parts by mass
  Percentage of Compound 104B: 2.3%
Photopolymerizable compound 105: Tricyclodecane dimethanol diacrylate (molecular weight: 304)
  Compound 105A: 89.8 parts by mass
  Compound 105B: 2.9 parts by mass
  Percentage of Compound 105B: 3.2%
Photopolymerizable compound 106: Dioxane glycol diacrylate (molecular weight: 326)
  Compound 106A: 90.0 parts by mass
  Compound 106B: 2.4 parts by mass
  Percentage of Compound 106B: 2.7%
Photopolymerizable compound 107: Tris(2-hydroxyethyl)isocyanurate triacrylate (molecular weight: 423)
  Compound 107A: 81.4 parts by mass
  Compound 107B: 3.9 parts by mass
  Percentage of Compound 107B: 4.8%

Photopolymerizable compound 108: Glycerin propoxy triacrylate (molecular weight: 428)
  Compound 108A: 89.8 parts by mass
  Compound 108B: 3.8 parts by mass
  Percentage of Compound 108B: 4.1%
Photopolymerizable Compound 113: 3PO-modified trimethylolpropane triacrylate (molecular weight: 471)
  Compound 113A: 70.4 parts by mass
  Compound 113B: 12.1 parts by mass
  Percentage of Compound 113B: 17.1%

<Preparation of Pigment Dispersions>

Pigment dispersions 1 to 4 were prepared in the following manner. The following two kinds of compounds were placed in a stainless steel beaker and melted by heating on a hot plate at 65° C. for 1 hour with stirring.

AJISPER PB824 (manufactured by Ajinomoto Fine-Techno Co., Inc.) 9 parts by mass

Photopolymerizable compound 1 71 parts by mass

The thus obtained mixture was cooled to room temperature, and then 20 parts by mass of any one of the following pigments was added thereto. The thus obtained mixture was placed in a glass bottle together with 200 g of zirconia beads having a diameter of 0.5 mm, and the glass bottle was hermetically sealed. The mixture was subjected to dispersion treatment using a paint shaker for a certain time described below, and then the zirconia beads were removed.

Pigment 1: Pigment Black 7 (#52 manufactured by Mitsubishi Chemical Corporation), 5 hours Pigment 2: Pigment Blue 15:4 (CHROMOFINE BLUE 6332JC manufactured by Dainichiseika Color & Chemicals Mfg. Co., Ltd.), 5 hours Pigment 3: Pigment Red 122 (CHROMOFINE RED 6112JC manufactured by Dainichiseika Color & Chemicals Mfg. Co., Ltd.), 8 hours Pigment 4: Pigment Yellow 150 (E4GN-GT CH20015 manufactured by LANXESS), 8 hours Further, comparative pigment dispersions 1 to 4 were also prepared in the same manner as the above-described pigment dispersions 1 to 4 except that "Photopolymerizable compound 1 71 parts by mass" was changed to "Photopolymerizable compound 102 71 parts by mass".

<Preparation of Ink Compositions>

Various components and the above-described pigment dispersions were mixed based on the following ink compositions expressed in parts by mass and shown in Table 2 to 16, and the thus obtained mixtures were heated to 80° C. with stirring. The thus obtained solutions were filtered through a 3 μm-Teflon (trademark) membrane filter manufactured by ADVATEC while being heated. Then, image evaluation was performed according to criteria that will be described later.

Curable Oligomer (Polyester Acrylate Oligomer)

Hyper-branched polyester acrylate (Etercure 6361-100 manufactured by Eternal Chemical, viscosity at 25° C.: 150 to 250 mPa·s, number of functional groups: 8)

Hyper-branched polyester acrylate (Etercure 6362-100 manufactured by Eternal Chemical, viscosity at 25° C.: 400 to 800 mPa·s, number of functional groups: 12 to 15)

Polyester acrylate oligomer (CN2203 manufactured by Sartomer, viscosity at 25° C.: 350 mPa·s, number of functional groups: 6)

Polyester acrylate oligomer (Laromer PE9074 manufactured by BASF, viscosity at 25° C.: 10000 mPa·s, number of functional groups: 3)

(Photoinitiator)
SPEEDCURE TPO (manufactured by DKSH)
ITX (manufactured by DKSH)
(Surfactant)
KF-352 (manufactured by Shin-Etsu Chemical Co., Ltd.)
(Auxiliary Sensitizer)
Kayacure EPA (manufactured by Nippon Kayaku Co., Ltd.)

TABLE 2

| Ink Composition 1 | | K | C | M | Y |
|---|---|---|---|---|---|
| Comparative Pigment Dispersion | 1 | 12.5 | | | |
| | 2 | | 12.5 | | |
| | 4 | | | 21.0 | |
| | 3 | | | | 15.0 |
| Photopolymerizable Compound | 104 | 18.5 | 18.5 | 10.0 | 16.0 |
| Photopolymerizable Compound | 102 | 30.0 | 30.0 | 30.0 | 30.0 |
| Photopolymerizable Compound | 103 | 15.0 | 15.0 | 15.0 | 15.0 |
| Polyester Acrylate Oligomer | Laromer PE9074 (manufactured by BASF) | 10.0 | 10.0 | 10.0 | 10.0 |
| Gelling Agent | Stearyl stearate 5% | 5.0 | 5.0 | 5.0 | 5.0 |
| Surfactant | KF-352 (Shin-Etsu Chemical Co., Ltd.) | 0.1 | 0.1 | 0.1 | 0.1 |
| Photoinitiator | SPEEDCURE TPO | 5.0 | 5.0 | 5.0 | 5.0 |
| Photoinitiator | ITX(DKSH) | 2.0 | 2.0 | 2.0 | 2.0 |
| Auxiliary Sensitizer | KayacureEPA (Nippon Kayaku Co., Ltd.) | 2.0 | 2.0 | 2.0 | 2.0 |

TABLE 3

| Ink Composition 2 | | K | C | M | Y |
|---|---|---|---|---|---|
| Comparative Pigment Dispersion | 1 | 12.5 | | | |
| | 2 | | 12.5 | | |
| | 4 | | | 21.0 | |
| | 3 | | | | 15.0 |
| Photopolymerizable Compound | 104 | 23.5 | 23.5 | 15.0 | 21.0 |
| Photopolymerizable Compound | 103 | 20.0 | 20.0 | 20.0 | 20.0 |
| Photopolymerizable Compound | 108 | 20.0 | 20.0 | 20.0 | 20.0 |
| Polyester Acrylate Oligomer | Laromer PE9074 (manufactured by BASF) | 10.0 | 10.0 | 10.0 | 10.0 |
| Gelling Agent | Stearyl stearate 5% | 5.0 | 5.0 | 5.0 | 5.0 |
| Surfactant | KF-352 (Shin-Etsu Chemical Co., Ltd.) | 0.1 | 0.1 | 0.1 | 0.1 |
| Photoinitiator | SPEEDCURE TPO | 5.0 | 5.0 | 5.0 | 5.0 |
| Photoinitiator | ITX(DKSH) | 2.0 | 2.0 | 2.0 | 2.0 |
| Auxiliary Sensitizer | KayacureEPA (Nippon Kayaku Co., Ltd.) | 2.0 | 2.0 | 2.0 | 2.0 |

TABLE 4

| Ink Composition 3 | | K | C | M | Y |
|---|---|---|---|---|---|
| Comparative Pigment Dispersion | 1 | 12.5 | | | |
| | 2 | | 12.5 | | |
| | 4 | | | 21.0 | |
| | 3 | | | | 15.0 |
| Photopolymerizable Compound | 101 | 13.5 | 13.5 | 5.0 | 11.0 |
| Photopolymerizable Compound | 105 | 25.0 | 25.0 | 25.0 | 25.0 |

TABLE 4-continued

| Ink Composition 3 | | | K | C | M | Y |
|---|---|---|---|---|---|---|
| Photopolymerizable Compound | 103 | | 25.0 | 25.0 | 25.0 | 25.0 |
| Polyester Acrylate Oligomer | Laromer PE9074 (manufactured by BASF) | | 10.0 | 10.0 | 10.0 | 10.0 |
| Gelling Agent | Stearyl stearate 5% | | 5.0 | 5.0 | 5.0 | 5.0 |
| Surfactant | KF-352 (Shin-Etsu Chemical Co., Ltd.) | | 0.1 | 0.1 | 0.1 | 0.1 |
| Photoinitiator | SPEEDCURE TPO | | 5.0 | 5.0 | 5.0 | 5.0 |
| Photoinitiator | ITX(DKSH) | | 2.0 | 2.0 | 2.0 | 2.0 |
| Auxiliary Sensitizer | KayacureEPA (Nippon Kayaku Co., Ltd.) | | 2.0 | 2.0 | 2.0 | 2.0 |

TABLE 5

| Ink Composition 4 | | | K | C | M | Y |
|---|---|---|---|---|---|---|
| Comparative Pigment Dispersion | 1 | | 12.5 | | | |
| | 2 | | | 12.5 | | |
| | 4 | | | | 21.0 | |
| | 3 | | | | | 15.0 |
| Photopolymerizable Compound | 101 | | 12.5 | 12.5 | 4.0 | 10.0 |
| Photopolymerizable Compound | 107 | | 5.0 | 5.0 | 5.0 | 5.0 |
| Photopolymerizable Compound | 106 | | 20.0 | 20.0 | 20.0 | 20.0 |
| Photopolymerizable Compound | 103 | | 30.0 | 30.0 | 30.0 | 30.0 |
| Polyester Acrylate Oligomer | Laromer PE9074 (manufactured by BASF) | | 6.0 | 6.0 | 6.0 | 6.0 |
| Gelling Agent | Stearyl stearate 5% | | 5.0 | 5.0 | 5.0 | 5.0 |
| Surfactant | KF-352 (Shin-Etsu Chemical Co., Ltd.) | | 0.1 | 0.1 | 0.1 | 0.1 |
| Photoinitiator | SPEEDCURE TPO | | 5.0 | 5.0 | 5.0 | 5.0 |
| Photoinitiator | ITX(DKSH) | | 2.0 | 2.0 | 2.0 | 2.0 |
| Auxiliary Sensitizer | KayacureEPA (Nippon Kayaku Co., Ltd.) | | 2.0 | 2.0 | 2.0 | 2.0 |

TABLE 6

| Ink Composition 5 | | | K | C | M | Y |
|---|---|---|---|---|---|---|
| Comparative Pigment Dispersion | 1 | | 12.5 | | | |
| | 2 | | | 12.5 | | |
| | 4 | | | | 21.0 | |
| | 3 | | | | | 15.0 |
| Photopolymerizable Compound | 113 | | 72.5 | 72.5 | 64.0 | 70.0 |
| Polyester Acrylate Oligomer | Laromer PE9074 (manufactured by BASF) | | 3.0 | 3.0 | 3.0 | 3.0 |
| Gelling Agent | Behenyl behenate 1%, Distearyl ketone 2% | | 3.0 | 3.0 | 3.0 | 3.0 |
| Surfactant | KF-352 (Shin-Etsu Chemical Co., Ltd.) | | 0.1 | 0.1 | 0.1 | 0.1 |
| Photoinitiator | SPEEDCURE TPO | | 5.0 | 5.0 | 5.0 | 5.0 |
| Photoinitiator | ITX(DKSH) | | 2.0 | 2.0 | 2.0 | 2.0 |
| Auxiliary Sensitizer | KayacureEPA (Nippon Kayaku Co., Ltd.) | | 2.0 | 2.0 | 2.0 | 2.0 |

TABLE 7

| Ink Composition 6 | | | K | C | M | Y |
|---|---|---|---|---|---|---|
| Pigment Dispersion | 1 | | 12.5 | | | |
| | 2 | | | 12.5 | | |
| | 4 | | | | 21.0 | |
| | 3 | | | | | 15.0 |

TABLE 7-continued

| Ink Composition 6 | | | K | C | M | Y |
|---|---|---|---|---|---|---|
| Photopolymerizable Compound | 4 | | 18.5 | 18.5 | 10.0 | 16.0 |
| Photopolymerizable Compound | 2 | | 30.0 | 30.0 | 30.0 | 30.0 |
| Photopolymerizable Compound | 3 | | 15.0 | 15.0 | 15.0 | 15.0 |
| Polyester Acrylate Oligomer | Laromer PE9074 (manufactured by BASF) | | 10.0 | 10.0 | 10.0 | 10.0 |
| Gelling Agent | Stearyl stearate 5% | | 5.0 | 5.0 | 5.0 | 5.0 |
| Surfactant | KF-352 (Shin-Etsu Chemical Co., Ltd.) | | 0.1 | 0.1 | 0.1 | 0.1 |
| Photoinitiator | SPEEDCURE TPO | | 5.0 | 5.0 | 5.0 | 5.0 |
| Photoinitiator | ITX(DKSH) | | 2.0 | 2.0 | 2.0 | 2.0 |
| Auxiliary Sensitizer | KayacureEPA (Nippon Kayaku Co., Ltd.) | | 2.0 | 2.0 | 2.0 | 2.0 |

TABLE 8

| Ink Composition 7 | | | K | C | M | Y |
|---|---|---|---|---|---|---|
| Pigment Dispersion | 1 | | 12.5 | | | |
| | 2 | | | 12.5 | | |
| | 4 | | | | 21.0 | |
| | 3 | | | | | 15.0 |
| Photopolymerizable Compound | 4 | | 23.5 | 23.5 | 15.0 | 21.0 |
| Photopolymerizable Compound | 3 | | 20.0 | 20.0 | 20.0 | 20.0 |
| Photopolymerizable Compound | 8 | | 20.0 | 20.0 | 20.0 | 20.0 |
| Polyester Acrylate Oligomer | Laromer PE9074 (manufactured by BASF) | | 10.0 | 10.0 | 10.0 | 10.0 |
| Gelling Agent | Stearyl stearate 5% | | 5.0 | 5.0 | 5.0 | 5.0 |
| Surfactant | KF-352 (Shin-Etsu Chemical Co., Ltd.) | | 0.1 | 0.1 | 0.1 | 0.1 |
| Photoinitiator | SPEEDCURE TPO | | 5.0 | 5.0 | 5.0 | 5.0 |
| Photoinitiator | ITX(DKSH) | | 2.0 | 2.0 | 2.0 | 2.0 |
| Auxiliary Sensitizer | KayacureEPA (Nippon Kayaku Co., Ltd.) | | 2.0 | 2.0 | 2.0 | 2.0 |

TABLE 9

| Ink Composition 8 | | | K | C | M | Y |
|---|---|---|---|---|---|---|
| Pigment Dispersion | 1 | | 12.5 | | | |
| | 2 | | | 12.5 | | |
| | 4 | | | | 21.0 | |
| | 3 | | | | | 15.0 |
| Photopolymerizable Compound | 1 | | 13.5 | 13.5 | 5.0 | 11.0 |
| Photopolymerizable Compound | 5 | | 25.0 | 25.0 | 25.0 | 25.0 |
| Photopolymerizable Compound | 3 | | 25.0 | 25.0 | 25.0 | 25.0 |
| Polyester Acrylate Oligomer | CN2203 | | 10.0 | 10.0 | 10.0 | 10.0 |
| Gelling Agent | Stearyl stearate 5% | | 5.0 | 5.0 | 5.0 | 5.0 |
| Surfactant | KF-352 (Shin-Etsu Chemical Co., Ltd.) | | 0.1 | 0.1 | 0.1 | 0.1 |
| Photoinitiator | SPEEDCURE TPO | | 5.0 | 5.0 | 5.0 | 5.0 |
| Photoinitiator | ITX(DKSH) | | 2.0 | 2.0 | 2.0 | 2.0 |
| Auxiliary Sensitizer | KayacureEPA (Nippon Kayaku Co., Ltd.) | | 2.0 | 2.0 | 2.0 | 2.0 |

TABLE 10

| Ink Composition 9 | | | K | C | M | Y |
|---|---|---|---|---|---|---|
| Pigment Dispersion | 1 | | 12.5 | | | |
| | 2 | | | 12.5 | | |
| | 4 | | | | 21.0 | |
| | 3 | | | | | 15.0 |
| Photopolymerizable Compound | 1 | | 12.5 | 12.5 | 4.0 | 10.0 |
| Photopolymerizable Compound | 6 | | 20.0 | 20.0 | 20.0 | 20.0 |
| Photopolymerizable Compound | 7 | | 5.0 | 5.0 | 5.0 | 5.0 |
| Photopolymerizable Compound | 3 | | 30.0 | 30.0 | 30.0 | 30.0 |
| Polyester Acrylate Oligomer | Etercure6362-100 | | 6.0 | 6.0 | 6.0 | 6.0 |
| Gelling Agent | Stearyl stearate 5% | | 5.0 | 5.0 | 5.0 | 5.0 |
| Surfactant | KF-352 (Shin-Etsu Chemical Co., Ltd.) | | 0.1 | 0.1 | 0.1 | 0.1 |
| Photoinitiator | SPEEDCURE TPO | | 5.0 | 5.0 | 5.0 | 5.0 |
| Photoinitiator | ITX(DKSH) | | 2.0 | 2.0 | 2.0 | 2.0 |
| Auxiliary Sensitizer | KayacureEPA (Nippon Kayaku Co., Ltd.) | | 2.0 | 2.0 | 2.0 | 2.0 |

TABLE 11

| Ink Composition 10 | | K | C | M | Y |
|---|---|---|---|---|---|
| Pigment Dispersion | 1 | 12.5 | | | |
| | 2 | | 12.5 | | |
| | 4 | | | 21.0 | |
| | 3 | | | | 15.0 |
| Photopolymerizable Compound | 1 | 22.5 | 22.5 | 14.0 | 20.0 |
| Photopolymerizable Compound | 5 | 25.0 | 25.0 | 25.0 | 25.0 |
| Photopolymerizable Compound | 3 | 25.0 | 25.0 | 25.0 | 25.0 |
| Polyester Acrylate Oligomer | Etercure6361-100 | 3.0 | 3.0 | 3.0 | 3.0 |
| Gelling Agent | Behenyl behenate 1%, Distearyl ketone 2% | 3.0 | 3.0 | 3.0 | 3.0 |
| Surfactant | KF-352 (Shin-Etsu Chemical Co., Ltd.) | 0.1 | 0.1 | 0.1 | 0.1 |
| Photoinitiator | SPEEDCURE TPO | 5.0 | 5.0 | 5.0 | 5.0 |
| Photoinitiator | ITX(DKSH) | 2.0 | 2.0 | 2.0 | 2.0 |
| Auxiliary Sensitizer | KayacureEPA (Nippon Kayaku Co., Ltd.) | 2.0 | 2.0 | 2.0 | 2.0 |

TABLE 12

| Ink Composition 11 | | K | C | M | Y |
|---|---|---|---|---|---|
| Pigment Dispersion | 1 | 12.5 | | | |
| | 2 | | 12.5 | | |
| | 4 | | | 21.0 | |
| | 3 | | | | 15.0 |
| Photopolymerizable Compound | 1 | 12.5 | 12.5 | 4.0 | 10.0 |
| Photopolymerizable Compound | 5 | 15.0 | 15.0 | 15.0 | 15.0 |
| Photopolymerizable Compound | 3 | 15.0 | 15.0 | 15.0 | 15.0 |
| Photopolymerizable Compound | Dipropylene glycol diacrylate (molecular weight: 242, APG-100 (manufactured by Shin Nakamura Chemical Co., Ltd.)) | 15.0 | 15.0 | 15.0 | 15.0 |
| Photopolymerizable Compound | 1,6-hexanedioldiacrylate (molecular weight: 226, A-HD (manufactured by Shin Nakamura Chemical Co., Ltd.)) | 15.0 | 15.0 | 15.0 | 15.0 |
| Polyester Acrylate Oligomer | Etercure6361-100 | 3.0 | 3.0 | 3.0 | 3.0 |
| Gelling Agent | Behenyl behenate 1%, Distearyl ketone 2% | 3.0 | 3.0 | 3.0 | 3.0 |
| Surfactant | KF-352 (Shin-Etsu Chemical Co., Ltd.) | 0.1 | 0.1 | 0.1 | 0.1 |
| Photoinitiator | SPEEDCURE TPO | 5.0 | 5.0 | 5.0 | 5.0 |
| Photoinitiator | ITX(DKSH) | 2.0 | 2.0 | 2.0 | 2.0 |
| Auxiliary Sensitizer | KayacureEPA (Nippon Kayaku Co., Ltd.) | 2.0 | 2.0 | 2.0 | 2.0 |

TABLE 13

| Ink Composition 12 | | K | C | M | Y |
|---|---|---|---|---|---|
| Pigment Dispersion | 1 | 12.5 | | | |
| | 2 | | 12.5 | | |
| | 4 | | | 21.0 | |
| | 3 | | | | 15.0 |
| Photopolymerizable Compound | 1 | 22.5 | 22.5 | 14.0 | 20.0 |
| Photopolymerizable Compound | 5 | 25.0 | 25.0 | 25.0 | 25.0 |
| Photopolymerizable Compound | 113 | 25.0 | 25.0 | 25.0 | 25.0 |
| Polyester Acrylate Oligomer | Etercure6361-100 | 3.0 | 3.0 | 3.0 | 3.0 |
| Gelling Agent | Behenyl behenate 1%, Distearyl ketone 2% | 3.0 | 3.0 | 3.0 | 3.0 |
| Surfactant | KF-352 (Shin-Etsu Chemical Co., Ltd.) | 0.1 | 0.1 | 0.1 | 0.1 |
| Photoinitiator | SPEEDCURE TPO | 5.0 | 5.0 | 5.0 | 5.0 |
| Photoinitiator | ITX(DKSH) | 2.0 | 2.0 | 2.0 | 2.0 |
| Auxiliary Sensitizer | KayacureEPA (Nippon Kayaku Co., Ltd.) | 2.0 | 2.0 | 2.0 | 2.0 |

TABLE 14

| Ink Composition 13 | | K | C | M | Y |
|---|---|---|---|---|---|
| Pigment Dispersion | 1 | 12.5 | | | |
| | 2 | | 12.5 | | |
| | 4 | | | 21.0 | |
| | 3 | | | | 15.0 |
| Photopolymerizable Compound | 1 | 20.5 | 20.5 | 12.0 | 18.0 |
| Photopolymerizable Compound | 5 | 25.0 | 25.0 | 25.0 | 25.0 |
| Photopolymerizable Compound | 3 | 25.0 | 25.0 | 25.0 | 25.0 |
| Polyester Acrylate Oligomer | Etercure6361-100 | 3.0 | 3.0 | 3.0 | 3.0 |
| Gelling Agent | Stearyl stearate 3%, Distearyl ketone 2% | 5.0 | 5.0 | 5.0 | 5.0 |
| Surfactant | KF-352 (Shin-Etsu Chemical Co., Ltd.) | 0.1 | 0.1 | 0.1 | 0.1 |
| Photoinitiator | SPEEDCURE TPO | 5.0 | 5.0 | 5.0 | 5.0 |
| Photoinitiator | ITX(DKSH) | 2.0 | 2.0 | 2.0 | 2.0 |
| Auxiliary Sensitizer | KayacureEPA (Nippon Kayaku Co., Ltd.) | 2.0 | 2.0 | 2.0 | 2.0 |

TABLE 15

| Ink Composition 14 | | K | C | M | Y |
|---|---|---|---|---|---|
| Pigment Dispersion | 1 | 12.5 | | | |
| | 2 | | 12.5 | | |
| | 4 | | | 21.0 | |
| | 3 | | | | 15.0 |
| Photopolymerizable Compound | 1 | 20.5 | 20.5 | 12.0 | 18.0 |
| Photopolymerizable Compound | 5 | 25.0 | 25.0 | 25.0 | 25.0 |
| Photopolymerizable Compound | 3 | 25.0 | 25.0 | 25.0 | 25.0 |
| Polyester Acrylate Oligomer | Etercure6361-100 | 3.0 | 3.0 | 3.0 | 3.0 |
| Gelling Agent | Stearyl stearate 3%, Cetyl palmitate 2% | 1.0 | .0 | 1.0 | 1.0 |
| Surfactant | KF-352 (Shin-Etsu Chemical Co., Ltd.) | 0.1 | 0.1 | 0.1 | 0.1 |
| Photoinitiator | SPEEDCURE TPO | 5.0 | 5.0 | 5.0 | 5.0 |
| Photoinitiator | ITX(DKSH) | 2.0 | 2.0 | 2.0 | 2.0 |
| Auxiliary Sensitizer | KayacureEPA (Nippon Kayaku Co., Ltd.) | 2.0 | 2.0 | 2.0 | 2.0 |

TABLE 16

| Ink Composition 15 | | K | C | M | Y |
|---|---|---|---|---|---|
| Pigment Dispersion | 1 | 12.5 | | | |
| | 2 | | 12.5 | | |
| | 4 | | | 21.0 | |
| | 3 | | | | 15.0 |
| Photopolymerizable Compound | 1 | 24.5 | 24.5 | 16.0 | 22.0 |
| Photopolymerizable Compound | 5 | 25.0 | 25.0 | 25.0 | 25.0 |
| Photopolymerizable Compound | 3 | 25.0 | 25.0 | 25.0 | 25.0 |
| Polyester Acrylate Oligomer | Etercure 6361-100 | 3.0 | 3.0 | 3.0 | 3.0 |
| Gelling Agent | Stearyl stearate 3%, Cetyl palmitate 2% | 3.0 | 3.0 | 3.0 | 3.0 |
| Surfactant | KF-352 | 0.1 | 0.1 | 0.1 | 0.1 |
| Photoinitiator | SPEEDCURE TPO | 5.0 | 5.0 | 5.0 | 5.0 |
| Photoinitiator | ITX(DKSH) | 2.0 | 2.0 | 2.0 | 2.0 |
| Auxiliary Sensitizer | Kayacure EPA | 2.0 | 2.0 | 2.0 | 2.0 |

<Ink-Jet Image Forming Method>

Each of the prepared ink compositions was loaded in an ink-jet recording apparatus having an ink-jet recording head equipped with piezo-type ink-jet nozzles. This apparatus was used to record an image on medium octavo-size coated paper (OK Top Coat manufactured by Oji Paper Co., Ltd.). It is to be noted that the recording medium was fed at a rate shown in Table 17.

TABLE 17

| Sample Number | Ink Composition | Printing | Linear Speed | Head Nozzle Diameter (µm) | Gelling Temperature (° C.) | Recording Material Temperature (at the time of landing of ink before exposure to light) (° C.) | Temperature Δ (° C.) | Remarks |
|---|---|---|---|---|---|---|---|---|
| 1 | Ink Composition 1 | Just after loading | 60 m/s | 20 | 54 | 44 | −10 | Comparative Example |
| 2 | Ink Composition 1 | 4 days after loading, 90° C. | 60 m/s | 20 | 54 | 44 | −10 | Comparative Example |
| 3 | Ink Composition 2 | Just after loading | 60 m/s | 20 | 54 | 44 | −10 | Comparative Example |
| 4 | Ink Composition 2 | 4 days after loading, 90° C. | 60 m/s | 20 | 54 | 44 | −10 | Comparative Example |
| 5 | Ink Composition 3 | Just after loading | 60 m/s | 20 | 54 | 44 | −10 | Comparative Example |
| 6 | Ink Composition 3 | 4 days after loading, 90° C. | 60 m/s | 20 | 54 | 44 | −10 | Comparative Example |
| 7 | Ink Composition 4 | Just after loading | 60 m/s | 20 | 54 | 44 | −10 | Comparative Example |
| 8 | Ink Composition 4 | 4 days after loading, 90° C. | 60 m/s | 20 | 54 | 44 | −10 | Comparative Example |
| 9 | Ink Composition 5 | Just after loading | 60 m/s | 20 | 50 | 44 | −6 | Comparative Example |
| 10 | Ink Composition 5 | 4 days after loading, 90° C. | 60 m/s | 20 | 50 | 44 | −6 | Comparative Example |
| 11 | Ink Composition 6 | Just after loading | 30 m/s | 20 | 54 | 44 | −10 | Example |
| 12 | Ink Composition 6 | Just after loading | 60 m/s | 20 | 54 | 44 | −10 | Example |
| 13 | Ink Composition 6 | 4 days after loading, 90° C. | 30 m/s | 20 | 54 | 44 | −10 | Example |
| 14 | Ink Composition 6 | 4 days after loading, 90° C. | 30 m/s | 30 | 54 | 44 | −10 | Example |
| 15 | Ink Composition 7 | Just after loading | 30 m/s | 20 | 54 | 44 | −10 | Example |
| 16 | Ink Composition 7 | Just after loading | 60 m/s | 20 | 54 | 44 | −10 | Example |
| 17 | Ink Composition 7 | 4 days after loading, 90° C. | 30 m/s | 20 | 54 | 44 | −10 | Example |
| 18 | Ink Composition 7 | 4 days after loading, 90° C. | 30 m/s | 30 | 54 | 44 | −10 | Example |
| 19 | Ink Composition 8 | Just after loading | 60 m/s | 20 | 54 | 44 | −10 | Example |
| 20 | Ink Composition 8 | 4 days after loading, 90° C. | 60 m/s | 20 | 54 | 44 | −10 | Example |

TABLE 17-continued

| Sample Number | Ink Composition | Printing | Linear Speed | Head Nozzle Diameter (μm) | Gelling Temperature (° C.) | Recording Material Temperature (at the time of landing of ink before exposure to light) (° C.) | Temperature Δ (° C.) | Remarks |
|---|---|---|---|---|---|---|---|---|
| 21 | Ink Composition 9 | Just after loading | 60 m/s | 20 | 54 | 44 | −10 | Example |
| 22 | Ink Composition 9 | 4 days after loading, 90° C. | 60 m/s | 20 | 54 | 44 | −10 | Example |
| 23 | Ink Composition 10 | Just after loading | 60 m/s | 20 | 60 | 44 | −16 | Example |
| 24 | Ink Composition 10 | 4 days after loading, 90° C. | 60 m/s | 20 | 60 | 44 | −16 | Example |
| 25 | Ink Composition 11 | Just after loading | 60 m/s | 20 | 57 | 44 | −13 | Example |
| 26 | Ink Composition 11 | 4 days after loading, 90° C. | 60 m/s | 20 | 57 | 44 | −13 | Example |
| 27 | Ink Composition 12 | Just after loading | 60 m/s | 20 | 60 | 44 | −16 | Example |
| 28 | Ink Composition 12 | 4 days after loading, 90° C. | 60 m/s | 20 | 60 | 44 | −16 | Example |
| 29 | Ink Composition 13 | Just after loading | 60 m/s | 20 | 57 | 40 | −17 | Example |
| 30 | Ink Composition 13 | 4 days after loading, 90° C. | 60 m/s | 20 | 57 | 40 | −17 | Example |
| 31 | Ink Composition 14 | Just after loading | 60 m/s | 20 | 50 | 33 | −14 | Example |
| 32 | Ink Composition 14 | 4 days after loading, 90° C. | 60 m/s | 20 | 50 | 33 | −14 | Example |
| 33 | Ink Composition 15 | Just after loading | 60 m/s | 20 | 47 | 33 | −14 | Comparative Example |
| 34 | Ink Composition 15 | 4 days after loading, 90° C. | 60 m/s | 20 | 47 | 33 | −14 | Comparative Example |

An ink supply system comprises an ink tank, an ink channel, a sub-ink tank just before an ink-jet recording head, a pipe equipped with a metal filter, and a piezo head. The ink from the ink tank to the head is heated to 90° C. in a heating region provided in the ink tank and the recording head. The ink tank is made of SUS304, and the metal filter is made of SUS316. A voltage was applied so that the volume of ink per droplet was 2.5 pl, and each of the YMCK inks was ejected from four heads having a nozzle diameter of 20 μm and a resolution of 360 dpi to form a solid image of 1440×1440 dpi.

Further, a voltage was applied so that the volume of ink per droplet was 14 pl, and each of some of the YMCK ink compositions shown in the tables was ejected from two heads having a nozzle diameter of 30 μm and a resolution of 360 dpi to form a solid image of 720×720 dpi.

After printing, the ink was cured by an LED lamp manufactured by Phoseon Technology (395 nm, 8 W/cm², water cooled unit). The distance from the tube surface of the LED lamp to the recording medium was set to 50 mm (irradiation width in feed direction: 100 mm).

The following various evaluations were made when printing was performed just after the ink was loaded and when printing was performed after the ink supply system was filled with the ink and then the ink was allowed to stand for 4 days (the ink was kept heated at 90° C.)

<Various Evaluations>
<Ejectability>

The solid image printed using each of the YMCK inks of Example or Comparative Example was visually observed to determine the presence or absence of a white spot (caused by nozzle clogging).

◯: No white spot is observed.

Δ: One or two white spots are observed, but there is no problem on practical use.

x: Many white spots are observed.

<Continuous Ejectability>

Each of the YMCK inks was continuously ejected using the above ink-jet recording apparatus for 30 minutes to print a solid image, and the solid image was visually observed to determine the presence or absence of a white spot (caused by nozzle clogging).

◯: No white spot is observed.

Δ: One or two white spots are observed, but there is no problem on practical use.

x: Many white spots are observed.

<Curability (Pensile Hardness)>

A 100% printed area on the tenth OK Top Coat Paper sheet on which an image of each sample was printed was allowed to stand at 25° C. and 60% RH for 24 hours, and then the pensile hardness of the surface of the image was measured in accordance with JIS-K-5400 to evaluate curability according to the following criteria.

◯: Pencil hardness is 2H or more.

Δ: Pencil hardness is H to B.

x: Pencil hardness is 2B or less.

<Solution Stability of Gelling Agent>

The ink was allowed to stand at 100° C. for 4 hours, and was then visually observed to determine the state of the gelling agent dissolved therein.

◯: Neither separation nor precipitation has occurred.

Δ: The gelling agent appears slightly white and cloudy.

x: Oil globules have gathered on the surface (phase separation has occurred).

<Image Quality (Character Image Quality)>

The kanji character " 希 " was printed in 3 pt-Mincho font with each black ink sample, and the image quality of the printed character was visually observed and evaluated.

○: The character is reproducible.
Δ: The character is partially illegible.
x: The character is illegible.
The evaluation results of image formation are shown in Table 18.

TABLE 18

| Sample Number | Dissolution Stability of Gel After still-standing at 100° C. for 4 hrs | Ejectability During heating at 100° C. | Continuous Ejectability 100% printed area | Curability Pencil hardness | Printed Character Quality 3-point Mincho | Remarks |
|---|---|---|---|---|---|---|
| 1 | ○ | X | X | ○ | ○ | Comparative Example |
| 2 | Δ | X | X | ○ | ○ | Comparative Example |
| 3 | ○ | X | X | Δ | Δ | Comparative Example |
| 4 | Δ | X | X | Δ | Δ | Comparative Example |
| 5 | ○ | X | X | ○ | ○ | Comparative Example |
| 6 | Δ | X | X | ○ | ○ | Comparative Example |
| 7 | ○ | X | X | Δ | Δ | Comparative Example |
| 8 | ○ | X | X | Δ | Δ | Comparative Example |
| 9 | X | Δ | X | X | ○ | Comparative Example |
| 10 | X | Δ | X | X | X | Comparative Example |
| 11 | ○ | Δ | Δ | ○ | ○ | Example |
| 12 | ○ | Δ | Δ | Δ | ○ | Example |
| 13 | ○ | Δ | Δ | ○ | ○ | Example |
| 14 | ○ | ○ | ○ | ○ | Δ | Example |
| 15 | ○ | ○ | Δ | ○ | ○ | Example |
| 16 | ○ | ○ | Δ | ○ | ○ | Example |
| 17 | ○ | ○ | Δ | ○ | ○ | Example |
| 18 | ○ | ○ | ○ | ○ | Δ | Example |
| 19 | ○ | ○ | ○ | ○ | ○ | Example |
| 20 | ○ | ○ | ○ | ○ | ○ | Example |
| 21 | ○ | ○ | ○ | ○ | ○ | Example |
| 22 | ○ | ○ | ○ | ○ | ○ | Example |
| 23 | ○ | ○ | ○ | ○ | ○ | Example |
| 24 | ○ | ○ | ○ | ○ | ○ | Example |
| 25 | ○ | ○ | ○ | ○ | ○ | Example |
| 26 | ○ | Δ | Δ | ○ | ○ | Example |
| 27 | ○ | Δ | Δ | Δ | ○ | Example |
| 28 | Δ | Δ | Δ | Δ | ○ | Example |
| 29 | ○ | ○ | ○ | ○ | ○ | Example |
| 30 | ○ | ○ | ○ | ○ | ○ | Example |
| 31 | ○ | ○ | ○ | ○ | ○ | Example |
| 32 | ○ | ○ | ○ | ○ | ○ | Example |
| 33 | ○ | ○ | ○ | X | X | Comparative Example |
| 34 | Δ | ○ | ○ | X | X | Comparative Example |

The ink compositions of Examples were excellent in all the evaluation items.

This application is based on Japanese Patent Application No. 2013-186249 filed on Sep. 9, 2013, the entire disclosure of which including the specification, the drawings, and the abstract are incorporated herein by reference.

INDUSTRIAL APPLICABILITY

According to the present invention, it is possible to provide an actinic radiation-curable ink-jet ink that does not undergo a local thermal polymerization reaction, and an image forming method using the same.

REFERENCE SIGNS LIST 10, 20 Ink-jet printer
12 Recording medium
14, 24 Ink-jet recording head
16, 26 Head carriage
18, 28 Actinic radiation irradiation part
19 Temperature control part
27 Guide part

The invention claimed is:

1. An actinic radiation-curable ink-jet ink that undergoes temperature-dependent reversible sol-gel phase transition, comprising a photopolymerizable compound, a photoinitiator, and a gelling agent, wherein
the photopolymerizable compound comprises one or more combinations of:
a compound A that has n (n is an integer of 2 or more) (meth)acrylate ester units, is represented by the following formula, and has a molecular weight in a range of 280 to 1500; and a compound B that has n−1 (meth)acrylate ester units and a hydroxyl group, is represented by the following formula, and has a molecular weight in a range of 280 to 1500,

[Chemical Formula 1]

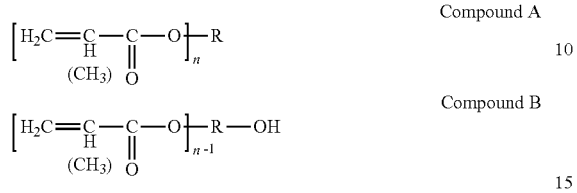

Compound A

Compound B (wherein n is an integer of 2 or more, R is an n-valent branched or unbranched linear or cyclic hydrocarbon group that optionally contains an oxygen atom or a nitrogen atom, and n and R in both the compounds A and B are the same integer and the same structure, respectively), in at least one of the combinations of the compound A and the compound B, an amount of the compound B contained is 5 to 15 mass % of a total mass of the compound A as a counterpart of the compound B, an amount of the gelling agent contained is 0.5 to 7.0 mass % of a total mass of the ink, and a gelling temperature of the ink is 50° C. or more.

2. The actinic radiation-curable ink-jet ink according to claim 1, wherein a total mass of the compound A and the compound B constituting a combination in which an amount of the compound B contained is 5 to 15 mass % of a total mass of the compound A as a counterpart of the compound B is larger than a total mass of the compound A and the compound B constituting a combination in which an amount of the compound B contained is not 5 to 15 mass % of a total mass of the compound A as a counterpart of the compound B.

3. The actinic radiation-curable ink-jet ink according to claim 2, wherein the compound A is at least one of the following (meth)acrylate compounds (1) and (2):

(1) a bifunctional (meth)acrylate compound containing, in its molecule, 3 to 14 structures represented by (—C(CH$_3$)H—CH$_2$—O—) or (—CH$_2$—CH$_2$—O—); and (2) a bi- or higher-functional (meth)acrylate compound having a cyclic structure in its molecule.

4. The actinic radiation-curable ink-jet ink according to claim 2, wherein in all the combinations of the compound A and the compound B, an amount of the compound B contained is 5 to 15 mass % of a total mass of the compound A as a counterpart of the compound B.

5. The actinic radiation-curable ink-jet ink according to claim 2, wherein the combination of the compound A and the compound B is at least one of a combination of a compound represented by the following general formula (3)-A and a compound represented by the following general formula (3)-B, a combination of a compound represented by the following general formula (4)-A and a compound represented by the following general formula (4)-B, a combination of a compound represented by the following general formula (5)-A and a compound represented by the following general formula (5)-B, and a combination of a compound represented by the following general formula (6)-A and a compound represented by the following general formula (6)-B,

[Chemical Formula 2]

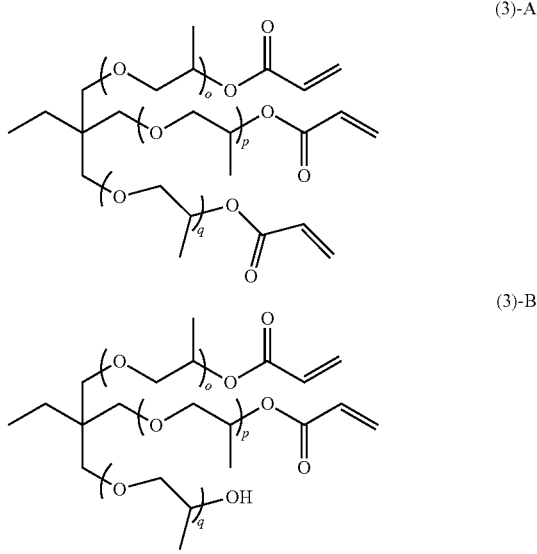

(3)-A (3)-B (wherein o, p, and q are integers satisfying the condition o+p+q=2 to 6)

[Chemical Formula 3]

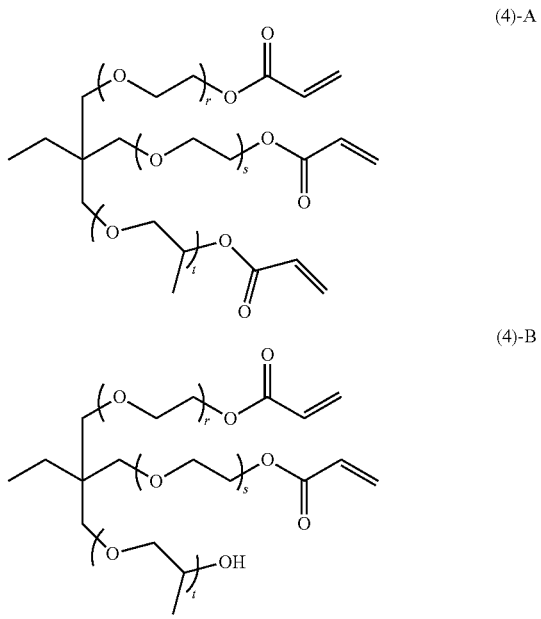

(4)-A (4)-B (wherein r, s, and t are integers satisfying the condition r+s+t=5 to 10)

[Chemical Formula 4]

(5)-A
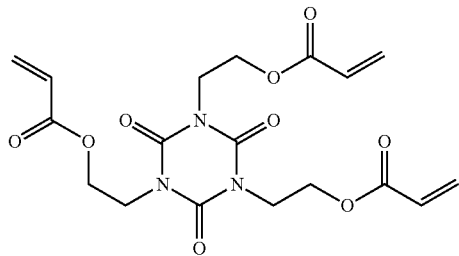

(5)-B
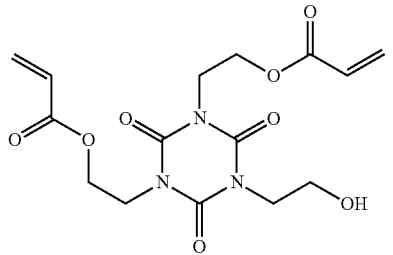

[Chemical Formula 5]

(6)-A
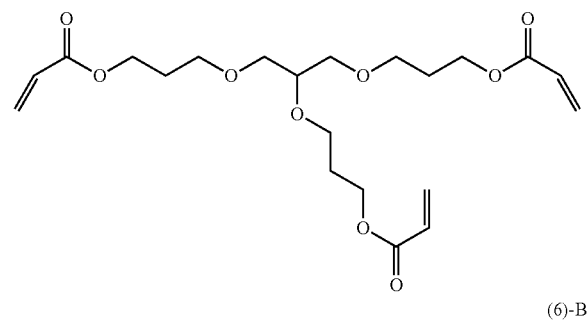

(6)-B
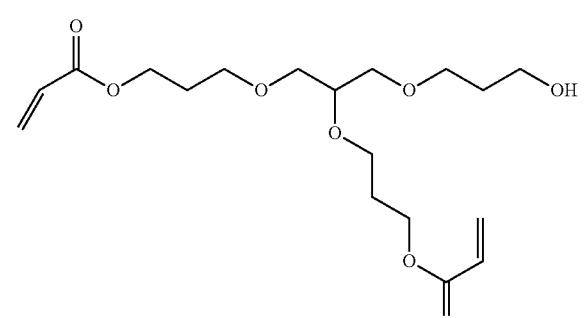

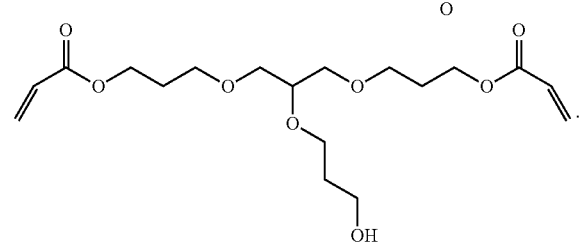

6. The actinic radiation-curable ink-jet ink according to claim 2, which contains substantially no compound whose molecular weight is not in a range of 280 to 1500.

7. The actinic radiation-curable ink-jet ink according to claim 2, further comprising a colorant.

8. An image forming method comprising using the actinic radiation-curable ink-jet ink according to claim 2, wherein
a temperature of a recording material when the ink at 50 to 100° C. ejected from an ink-jet head is landed on the recording material is set to be lower than a sol-gel phase transition temperature of the ink by 10 to 20° C.

9. An ink-jet recording apparatus comprising a head carriage that accommodates a plurality of ink-jet recording heads, an ink tank that holds an ink-jet ink, an ink channel connected to the ink tank and the head carriage, an actinic radiation irradiation part, and a temperature control part, wherein a heating region is provided in at least part of a range from the ink tank to the ink-jet recording heads, the ink-jet recording heads and the ink channel are entirely or partially formed of a metallic member, and the ink according to claim 2 is further contained.

10. The actinic radiation-curable ink-jet ink according to claim 1, wherein the compound A is at least one of the following (meth)acrylate compounds (1) and (2):
(1) a bifunctional (meth)acrylate compound containing, in its molecule, 3 to 14 structures represented by (—C(CH$_3$)H—CH$_2$—O—) or (—CH$_2$—CH$_2$—O—); and
(2) a bi- or higher-functional (meth)acrylate compound having a cyclic structure in its molecule.

11. The actinic radiation-curable ink-jet ink according to claim 10, wherein in all the combinations of the compound A and the compound B, an amount of the compound B contained is 5 to 15 mass % of a total mass of the compound A as a counterpart of the compound B.

12. The actinic radiation-curable ink-jet ink according to claim 10, wherein the combination of the compound A and the compound B is at least one of a combination of a compound represented by the following general formula (3)-A and a compound represented by the following general formula (3)-B, a combination of a compound represented by the following general formula (4)-A and a compound represented by the following general formula (4)-B, a combination of a compound represented by the following general formula (5)-A and a compound represented by the following general formula (5)-B, and a combination of a compound represented by the following general formula (6)-A and a compound represented by the following general formula (6)-B,

[Chemical Formula 2]

(3)-A
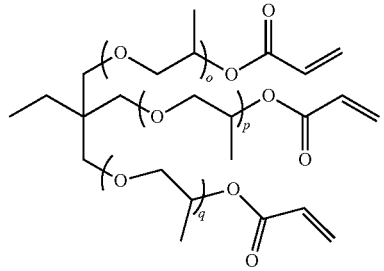

(3)-B

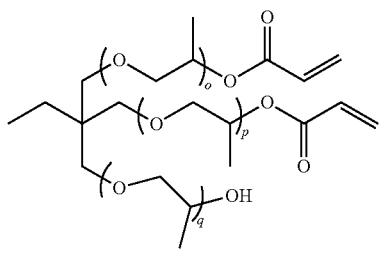

(wherein o, p, and q are integers satisfying the condition o+p+q=2 to 6)

[Chemical Formula 3]

(4)-A

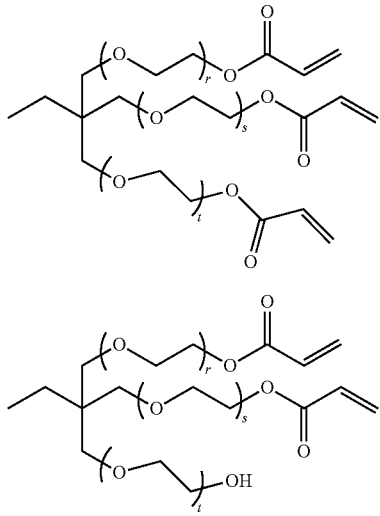

(4)-B (wherein r, s, and t are integers satisfying the condition r+s+t=5 to 10)

[Chemical Formula 4]

(5)-A

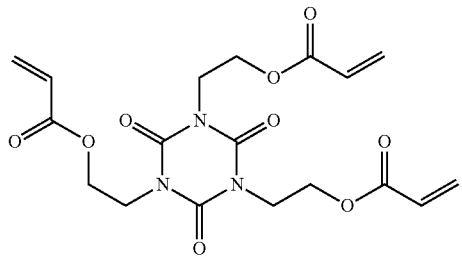

(5)-B

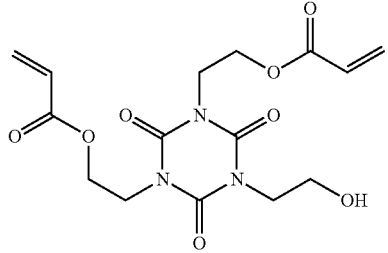

[Chemical Formula 5]

(6)-A

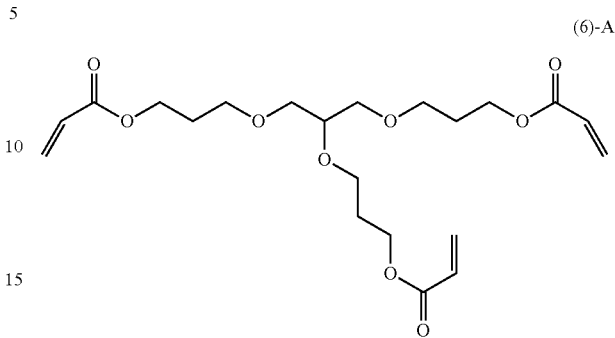

(6)-B

13. The actinic radiation-curable ink-jet ink according to claim 10, which contains substantially no compound whose molecular weight is not in a range of 280 to 1500.

14. The actinic radiation-curable ink-jet ink according to claim 10, further comprising a colorant.

15. The actinic radiation-curable ink-jet ink according to claim 1, wherein in all the combinations of the compound A and the compound B, an amount of the compound B contained is 5 to 15 mass % of a total mass of the compound A as a counterpart of the compound B.

16. The actinic radiation-curable ink-jet ink according to claim 1, wherein the combination of the compound A and the compound B is at least one of a combination of a compound represented by the following general formula (3)-A and a compound represented by the following general formula (3)-B, a combination of a compound represented by the following general formula (4)-A and a compound represented by the following general formula (4)-B, a combination of a compound represented by the following general formula (5)-A and a compound represented by the following general formula (5)-B, and a combination of a compound represented by the following general formula (6)-A and a compound represented by the following general formula (6)-B,

[Chemical Formula 2]

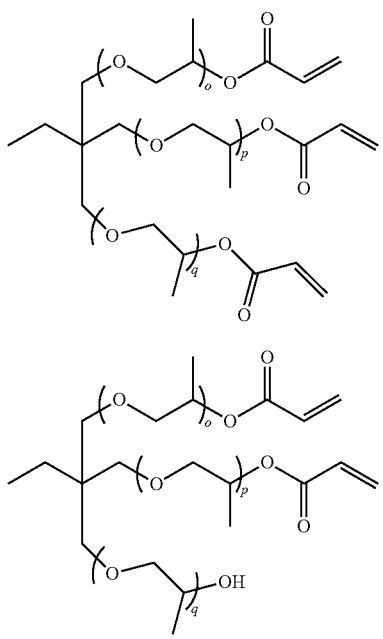

(3)-A (3)-B (wherein o, p, and q are integers satisfying the condition o+p+q=2 to 6)

[Chemical Formula 3]

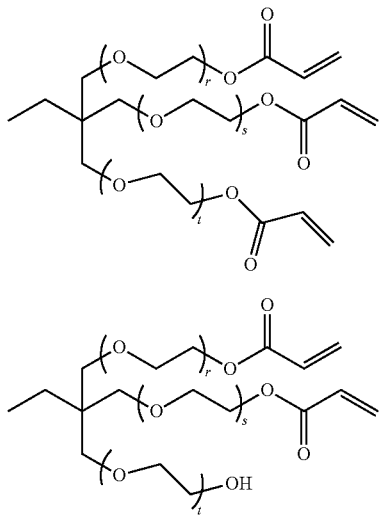

(4)-A (4)-B (wherein r, s, and t are integers satisfying the condition r+s+t=5 to 10)

[Chemical Formula 4]

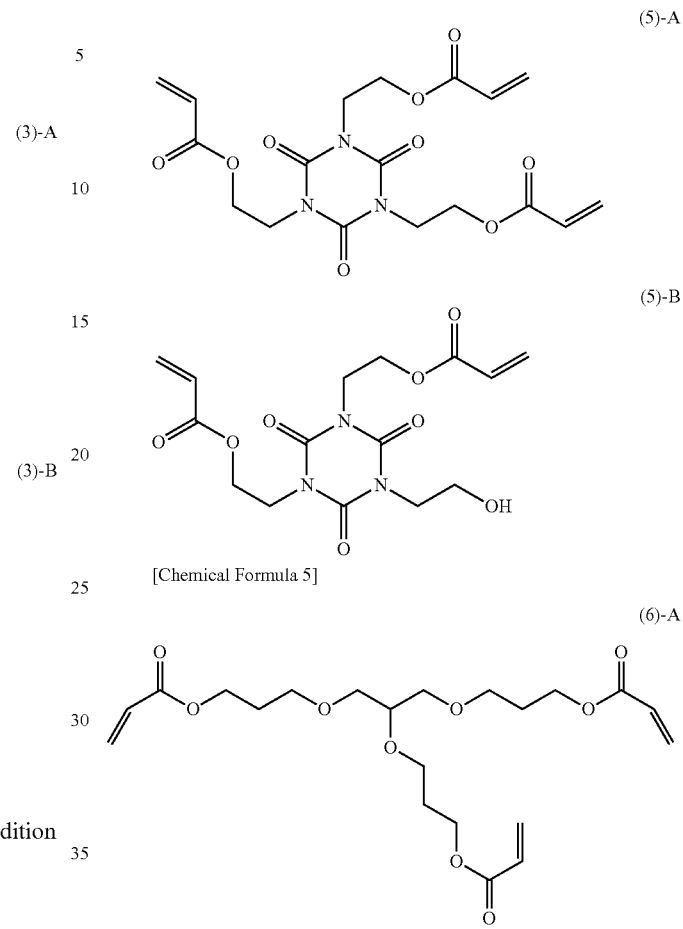

(5)-A (5)-B

[Chemical Formula 5]

(6)-A (6)-B

17. The actinic radiation-curable ink-jet ink according to claim 1, which contains substantially no compound whose molecular weight is not in a range of 280 to 1500.

18. The actinic radiation-curable ink-jet ink according to claim 1, further comprising a colorant.

19. An image forming method comprising using the actinic radiation-curable ink-jet ink according to claim 1, wherein
a temperature of a recording material when the ink at 50 to 100° C. ejected from an ink-jet head is landed on the recording material is set to be lower than a sol-gel phase transition temperature of the ink by 10 to 20° C.

20. An ink-jet recording apparatus comprising a head carriage that accommodates a plurality of ink-jet recording heads, an ink tank that holds an ink-jet ink, an ink channel connected to the ink tank and the head carriage, an actinic radiation irradiation part, and a temperature control part, wherein a heating region is provided in at least part of a range from the ink tank to the ink-jet recording heads, the ink-jet recording heads and the ink channel are entirely or partially formed of a metallic member, and the ink according to claim 1 is further contained.

* * * * *